US009235862B1

(12) United States Patent
Radner et al.

(10) Patent No.: US 9,235,862 B1
(45) Date of Patent: Jan. 12, 2016

(54) CORPORATE BOARD MANAGEMENT SYSTEM

(75) Inventors: Gregory Radner, Westwood, MA (US); Eric C. Prussman, Rowley, MA (US); Michael W. Stevens, Whitinsville, MA (US); Danh Dang, Lawrence, MA (US); Nicole Bahlin, Somerville, MA (US); Rebecca Cho Khurana, West Orange, NJ (US); Neeraj Jain, Quincy, MA (US); Robert Coran, Shrewsbury, MA (US); Jeron Paul, Cedar Hills, UT (US); Carmine Zinni, Foxboro, MA (US)

(73) Assignee: Thomson Reuters Global Resources, Baar (CH)

( * ) Notice: Subject to any disclaimer, the term of this patent is extended or adjusted under 35 U.S.C. 154(b) by 2147 days.

(21) Appl. No.: 11/426,290

(22) Filed: Jun. 23, 2006

(51) Int. Cl.
*G06Q 30/02* (2012.01)
*G06Q 10/10* (2012.01)
*G06Q 10/06* (2012.01)
*G06Q 30/06* (2012.01)
*G06Q 10/08* (2012.01)
*G06Q 50/00* (2012.01)

(52) U.S. Cl.
CPC .................................... *G06Q 50/01* (2013.01)

(58) Field of Classification Search
USPC .................................................. 705/1.1–912
See application file for complete search history.

(56) References Cited

U.S. PATENT DOCUMENTS

| | | | | |
|---|---|---|---|---|
| 6,275,575 | B1 * | 8/2001 | Wu | 379/202.01 |
| 6,574,599 | B1 * | 6/2003 | Lim et al. | 704/270 |
| 6,798,753 | B1 * | 9/2004 | Doganata et al. | 370/260 |
| 6,983,263 | B1 | 1/2006 | Demko et al. | |
| 6,988,128 | B1 * | 1/2006 | Alexander et al. | 709/206 |
| 7,552,393 | B2 * | 6/2009 | Hayes-Roth | 715/753 |
| 7,679,518 | B1 * | 3/2010 | Pabla et al. | 340/573.1 |
| 2004/0078256 | A1 * | 4/2004 | Glitho et al. | 705/8 |
| 2004/0111307 | A1 * | 6/2004 | Demsky et al. | 705/8 |
| 2005/0108268 | A1 | 5/2005 | Saintry et al. | |
| 2006/0045029 | A1 * | 3/2006 | Ethier et al. | 370/260 |
| 2006/0045030 | A1 * | 3/2006 | Bieselin | 370/260 |
| 2006/0069686 | A1 * | 3/2006 | Beyda et al. | 707/10 |
| 2006/0116918 | A1 * | 6/2006 | Flora et al. | 705/8 |
| 2006/0143214 | A1 * | 6/2006 | Teicher | 707/101 |
| 2006/0173936 | A1 * | 8/2006 | Castro et al. | 707/205 |
| 2007/0094065 | A1 * | 4/2007 | Wu et al. | 705/9 |
| 2007/0174104 | A1 * | 7/2007 | O'Sullivan et al. | 705/9 |
| 2007/0264989 | A1 * | 11/2007 | Palakkal et al. | 455/416 |
| 2007/0294120 | A1 * | 12/2007 | Berstis et al. | 705/9 |
| 2009/0019367 | A1 * | 1/2009 | Cavagnari et al. | 715/716 |
| 2009/0037534 | A1 * | 2/2009 | Castro et al. | 709/205 |

OTHER PUBLICATIONS

Ahmed et al. "A Meeting Scheduling System for Global Events on the Internet," ISOC, Geneva Switzerland, Jul. 1998.*

* cited by examiner

*Primary Examiner* — Jonathan Ouellette
(74) *Attorney, Agent, or Firm* — Bartholomew J. DiVita; Jeanpierre J. Giuliano; Katy Chan-Parsons

(57) ABSTRACT

Methods and systems for providing financial and/or board member information in a secured manner to members of boards of directors of companies and others through a publicly-available widely disseminated network.

29 Claims, 18 Drawing Sheets

CORPORATE BOARD MANAGEMENT SYSTEM

BACKGROUND OF THE INVENTION

1. Field of the Invention

The present invention generally relates to systems and methods for improving communications and information flow. In a specific embodiment, communications and information flow to and between corporate board members are improved.

2. Description of the Related Art

In the Sarbanes-Oxley era, boards of directors and the professionals who serve them are under increasing pressure to improve the governance processes of their companies. As a result of Sarbanes-Oxley, directors are being held more accountable for the actions of their company. Many corporate secretaries have voiced the opinion that since Sarbanes-Oxley, they have had to increasingly prioritize board communications and work harder to improve governance processes.

Directors on a corporate board are expected to make decisions for the corporation on a wide variety of issues, for example, quality initiatives, potential business deals, financial outlooks, compliance and business development. Boards of directors meet regularly to discuss management issues and to review any corporate deals that may be in progress. These meetings may be held monthly, quarterly or semi-annually. The board of directors needs to be kept up to date on corporate progress on a number of fronts. Information gathering for a board can be a daunting task, particularly when the company is a large international corporation. Information from subsidiaries and other corporate entities, other than the parent corporation, may be needed to be gathered and condensed. Such information may then be placed into a format wherein directors, with different levels of understanding pertaining to particular corporate matters, can all be brought up to at least a level of understanding such that they can make reasonable business decisions for the corporation.

Corporate secretaries are frequently assigned the task of distributing relevant company information and reference materials to members of the board of directors. This information may be placed in a number of corporate board books which may be directed to the members of the board in general or with respect to committees within the board of directors. The most current information available is often what is needed for a fully informed decision of the board.

Board members may comprise individuals residing in diverse geographic locations. Some board members may reside internationally as compared to the standard location of the board meeting. It therefore may be a formidable task to get all members of the board together in one place. The difficulty in getting board members together may relate not only to the geographic locations of board members at a particular point in time, but also relate to divergent scheduling concerns of the different board members. It is not atypical for a board member to be employed in a top level position at another company, and/or to be a board member on another corporate board.

In the past, board functions have relied on paper-based systems and the need to manually correlate travel arrangements among members of the board. Documents pertaining to corporate activities, as for example, potential deals, could be prepared and then disseminated to members for their review and comment. Ultimate selection of a course of action might then be required at a meeting of the board. Such methodology may be time-consuming, and decisions relating to corporate activities may have to be stalled until a board meeting can be held.

U.S. Pat. No. 6,983,263 describes an electronic boardroom to facilitate review of business specific information. Boards of directors are said to be able to conduct a meeting in real-time on-line. U.S. Pat. No. 6,983,263 asserts a system that permits directors to review comments of other directors on corporate issues as well as to supply their own comments for review by other directors. Via a web page links may be provided allowing one to review information such as deals to be reviewed, business reviews, financials, report generation, employee performance reviews, and productivity review. The electronic boardroom is said to facilitate movement of information and reduce the time and travel associated with face-to-face meetings.

U.S. Patent Publication No. 2005/0108268A1 describes a company board data processing system and method. Such system and method provides a user interface platform to supply information related to members of boards of companies and to enable comparison of board members or boards at the board member level. The system stores parameters related to board members of a plurality of boards. The user interface allows one to compare parameters between board members and/or boards at board member level. Information pertaining to the company such as operating profit and assets may also be stored.

While such electronic systems provide advantage over paper based systems, there are arguably numerous needs of directors which are not addressed. For example, directors need not only raw information pertaining to the company which they represent to make a decision, but may also rely on parallel information pertaining to peer-type companies. They may also need fast access to information pertaining to their representations on other corporate boards. Further, such systems also do little for the corporate secretary who must compile information needed by the members of the board, or committees of the board, who must schedule meetings among the board members, and who must keep meticulous notes of corporate minutes. Such systems may also fail in providing the extent of confidentiality necessary to prevent eavesdropping in communications and transmissions.

SUMMARY OF THE INVENTION

There is provided herein a computer-implemented method comprising: transmitting a request for data over a publicly-available widely disseminated network; receiving encrypted data over a secure socket layer while connected to the publicly-available widely disseminated network; decrypting the encrypted data; storing the decrypted data in encrypted form on a data storage device.

Protected transmissions may also be effectuated by another embodiment, a computer-implemented method comprising: gathering data; encrypting said data; configuring a transmission of said data so as to prevent decryption of said data by a remote receiving computer of said transmission while said remote receiving computer is connected to a publicly-available widely disseminated network; and transmitting said configured transmission of said data.

There is also disclosed a client-server network system for seeking and storing data in a secured manner, said system comprising: means for transmitting from the client a request for data over a publicly-available widely disseminated network; means for transmitting from the server encrypted data over a secure socket layer in response to the client request for data while the means for transmitting the request for data is connected to the publicly-available widely disseminated network; means for decrypting the encrypted data at said client; and means for storing said decrypted data in encrypted form on a data storage device at said client. Such means may include software, hardware, firmware or a combination thereof. The publicly-available widely disseminated computer network may be the Internet or other ICP/IP system.

Further security in protecting transmitted data may be provided by a method in a client-server system for transmitting confidential data over a publicly-available widely disseminated computer network, the method comprising: sending from a client to a server over a publicly-available widely disseminated computer network a request for data desired to be confidentially reviewed by the sender; receiving at the client the confidential data in encrypted form; storing the encrypted form confidential data on a storage medium associated with the client; disconnecting the client from the widely disseminated public computer network; decrypting at the client the encrypted form confidential data from the storage medium; and reviewing at the client the decrypted confidential data. Similarly, there is provided a computer-implemented method comprising: gathering data; encrypting the data; configuring a transmission of the data so as to prevent decryption of the data by a remote receiving computer of the transmission while the remote receiving computer is connected to a publicly-available widely disseminated network; and transmitting the configured transmission of the data to a remote receiving computer. Similarly, there is disclosed a computer system comprising: means for gathering data; means for encrypting the gathered data; means for configuring a transmission of the data so as to prevent decryption of the data by a remote receiving computer of the transmission while the remote receiving computer is connected to a publicly-available widely disseminated network; and means for transmitting the configured transmission of the data to a remote receiving computer. The means of such system may be software, hardware, firmware, or a combination thereof. The means for preventing decryption of said data by the remote receiving computer of the transmission while the remote receiving computer is connected to a publicly-available widely disseminated network, may be digital rights software controlling the remote receiving computer, the digital rights software operatively configured to determine if there is an active connection to a publicly-available widely disseminated computer network, and to prevent decryption of the encrypted data if such an active connection exists. The publicly-available widely disseminated computer network may be the Internet. The data gathered may be gathered through lines secured from public access.

In one embodiment, access to the information is limited to members of the board of a corporation.

Authorized information flow between members of a corporate board may be controlled as in a computer-implemented method comprising: classifying as private, restricted-access, or publicly-available information provided by a member of a corporate board and stored on data storage structure; and transmitting the information provided by the member of a corporate board from the data storage structure to another member of a corporate board upon request by the another member of a corporate board when the request is directed either to publicly-available information, or when the request seeks restricted-access information with the restriction not applying to the another member of a corporate board.

In one embodiment, the information being transmitted is information pertaining to members of the corporate board. Such information may be provided by a processing system comprising: a data storage structure storing parameters related to a plurality of board members belonging to a plurality of boards, wherein the data is stored as either private to other board member users of the system, semi-publicly available to other users of the system, or fully-public to other users of the system; board member user selection means configured for allowing a board member user of the system to provide information concerning the board member user to the data storage structure and mark the same as either private, semi-publicly available to other board member users of the system, or fully-public to users of the system; and board member user access means configured to allow a member of a corporate board to access fully-publicly available board member information, and if authorized, semi-publicly available information, pertaining to other users of the system, or other corporate boards.

The information requested by a board member may relate to financial information concerning a peer company. Thus, further envisioned is a method of using a computer to gather extemporaneous financial information about a peer company, the method comprising: seeking through a display device text input related to two or more peer companies of interest; reviewing on the display device in response to the text input two or more graphics representing a link to a financial information resource containing financial information specific to the peer companies; seeking by interacting with one or more of the two or more link graphics financial information pertaining to one or more peer companies; obtaining financial information pertaining to the one or more peer companies linked by the graphics upon interaction with the corresponding graphic. Financial information concerning a peer company may further be provided by a computer program product in a client-server network comprising a computer useable medium readable by a digital processing apparatus and tangibly embodying a program of instructions comprising computer readable program code executable by the digital processing apparatus to perform method steps comprising: generating company-specific links to financial information sources pertaining to a multiplicity of companies based on input from a client indicating interest in the multiplicity of companies; generating a computer-readable data transmission having a data structure comprising a portion identifying individual display graphics representing each company-specific link; transmitting the computer-readable data transmission to the client; performing extemporaneous searching of one or more links for financial information pertaining to the specific client upon interaction of the client with a display graphic associated with the company-specific link.

The information requested may also comprise information related to the board activities of two or more boards on which the board member user sits. In such embodiment, there is disclosed a method in a computer system for displaying information pertaining to the corporate activities of two or more companies on which the user serves as a member of a corporate board: displaying in a first portion of a computer screen a drop down box configured to display a plurality of selectable corporate board links which the user is authorized to review upon interaction with the drop down box; displaying information in a second portion of the computer screen pertaining to financial information folders of the selected corporate board link containing select information available for review by the user, wherein the folders include board books and annual reports; and displaying in third portion a list of documents available for the selected folder in the second portion. Further provided is a method in a computer system for displaying information pertaining to the corporate activities of two or more companies on which the user serves as a member of a corporate board: displaying in a first portion of a computer screen a drop down box configured to display a plurality of selectable corporate board links which the user is authorized to review upon interaction with the drop down box;

displaying information in a second portion of the computer screen pertaining to financial information folders of the selected corporate board link containing select information available for review by the user, wherein the folders include board books and annual reports; and displaying in third portion a list of documents available for the selected folder in the second portion.

Further, there are provided systems and methods for improving communications between board members, and improving the gathering and dissemination of information needed by board members.

In one such aspect, there is provided a computer system for creating a document from an outline, the system comprising: means for preparing an outline having headings and subheadings; means for writing text into, and importing documents into the outline at the level of headings and subheadings to form an annotated outline; means for converting the annotated outline into a generated document ordered with respect to the outline; and means for permitting movement of the headings and subheadings of the outline so as to generate a newly ordered document based upon the reordered headings and subheadings without the need for manual implementation of movement of the text or documents along with the headings or subheadings in the outline. The generated document may be a board book for a corporate board. The outline may relate to a event agenda, such as a meeting agenda. Similarly, there is provided a computer implemented method comprising: identifying in a first document a set of headings comprising a first heading and a second heading, the first heading being associated with a first set of text and the second heading being associated with a second set of text; detecting a reordering of the set of headings; and in response to detecting the reordering of the set of headings, automatically reordering the first set of text and the second set of text.

In another such aspect, there is provided a computer-implemented method comprising: generating a first query, the first query associated with a first electronic calendar maintained by a first party for periods of availability; generating a second query, the second query associated with a second electronic calendar maintained by a second party for periods of availability; receiving a set of responses to the first query and the second query identifying from the set of responses a period of common availability. Optionally the method may further comprise: determining whether any of the periods of common availability fit within a desired time frame for a communication between the first and second party. The method may further optionally comprise: sending out an invitation for a communication between the first and second party if a period of common availability is determined within a desired time frame for a communication between the first and second party. The desired time frame may be contiguous or non-contiguous. The communication between the first and second party may be selected from at least one of: a meeting, a teleconference, and an audio-visual/video conference. Similarly, there is disclosed a computer system for providing suggested meeting times in a desired time realm to two or more individuals maintaining on separate networks, electronic calendars indicating availability/non-availability over a period of time, the system comprising: means for querying the electronic calendars to determine periods of time within the desired time realm in which each of the two or more individuals have not indicated non-availability on their calendars; and means for correlating those periods of time in which non-availability is not indicated in each of the two or more individuals' electronic calendars to determine common periods of availability. Such system may further comprise: means for comparing the periods of common availability to determine those periods of time which most closely meet the desired time realm; and means for transmitting one or more proposed meeting times encompassing the common availability periods to the two or more individuals with a request for confirmation of attendance. The desired time realm may be a contiguous time frame, non-contiguous time frame, time of day, days forecast for particular weather conditions, or time of year.

While the methods and systems of such embodiments, or components thereof, may employ computers, such as general purpose computers, that are programmed to perform the various control and management functions in accordance with such method and system, such embodiments or elements of such embodiments, may entail the use of software, firmware, hardware, or a combination thereof. Thus, the various control functions may be implemented not only by software, but also by hardware, and firmware, or a combination thereof, for example, certain functionality may be performed by way of an application specified integrated circuit (ASIC), digital signal processor (DSP) hardware, network processor, field programmable gate array (FPGA), read-only memory (ROM) for storing software, random access memory (RAM), programmable logic device (PLD), programmable read only memory (PROM), programmable logic array (PLA), generic array logic (GAL), and non-volatile storage. Other hardware, conventional and/or custom, may also be included in effectuating such method embodiments and/or with respect to the system embodiments.

BRIEF DESCRIPTIONS OF DRAWINGS

Embodiments of the invention are illustrated in the accompanying drawings in which.

DETAILED DESCRIPTION OF THE INVENTION

In embodiments of the present invention, there is disclosed a system configured to provide information over a distributed network and to improve the speed in which information can be compiled and the security of its transmission and storage.

In one aspect of the uses of such systems members of corporate boards who seek relevant information pertaining to the companies they represent, and may seek streamlining of the preparation and distribution of corporate information to members of the corporate board. While further discussion of embodiments below concentrate on applications to members of a corporate board, as would be understood, such embodiments have wider application to users in general. Access to such systems may entail user authentication and the need for decryption software to decrypt encrypted communications.

Members of corporate boards may have need for both confidential and non-confidential information in order to make informed judgments about the appropriate course of action for a corporation. Information flow can be the bottleneck in the timing of decisions pertaining to corporate matters. The failure to make a decision at an optimal time point may mean wasted economic resources for a company and result in a failure to maximize profits obtainable by a corporation. Delays in information flow can be caused by the manner in which information is transmitted to a board member, e.g. by paper, orally or by electronic transfer, the time expenditure necessary to obtain data as, for example, the connection time in searching issues on the internet, and the inability of group decision makers to timely confer among each other to reach a consensus as to the appropriate course of action. Members of corporate boards may receive most of their pertinent information from corporate board books prepared by the corporate secretary, committee documents, email and letter communications between board members, on-line searches pertaining to matters of interest, and from discussions in corporate board meetings which often must be painstakingly scheduled due to competing requirements by different members of the corporate board.

Improvement on the methods of communication of information pertinent to corporate decision making to members of corporate boards are needed, as well as improvement in communication of information to persons in general, and in other occupations, jobs and duties.

Figure 13:
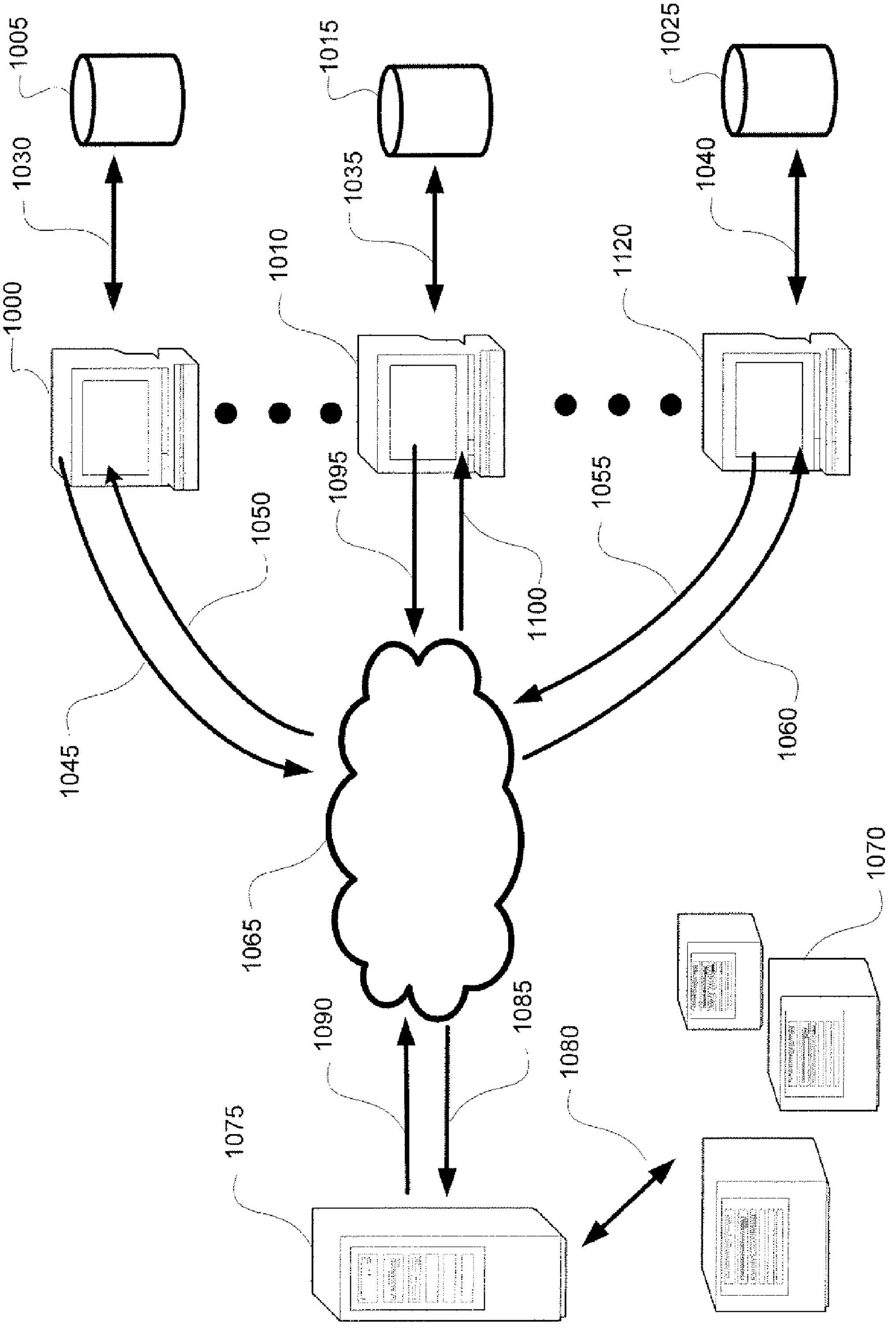
FIG. 13 is an illustration of a computer network system.

In an embodiment of the present invention such as illustrated in FIG. 13, there is provided an information providing computer system which allows for easy access by authorized members of a corporate board or any other type of user via a widely disseminated public network, such as the internet, yet provides secured transmissions between the information providing source and the information requesting source via encrypted transmissions. As illustrated in FIG. 13, multiple clients 1000, 1010, 1120 may seek information pertaining from a server 1075 through non-secure publicly-available lines 1045, 1095, 1055 by way of a publicly-available widely disseminated network system 1065 such as the Internet. Transmissions to the server 1085 also may be non-secure. Server 1075, which may obtain data from other servers 1070 via a secure or non-secure line 1080, may be programmed to provide secured transmissions 1090 through the publicly-available widely disseminated network system 1065 to clients 1000, 1010, and 1025. Server 1075 For example the transmissions 1050, 1100, and 1060 reaching clients 1000, 1010, and 1020, respectively, may be over a secure socket layer as via the SSL protocol employing public key encryption and ensuring data integrity. Clients 1000, 1010 and 1120, or a subset thereof, are provided the decryption code necessary for decoding the encrypted data. Clients 1000, 1010, and 1120 are also provided digital rights software which causes storage of the decrypted data to be stored as encrypted data when such information is transmitted (1030, 1035, 1040) to data storage devices 1005, 1015, and 1025, respectively, associated with the client. By keeping the data in storage devices 1005, 1015, and 1025 in encrypted form, extra security is provided against hackers when the user of the system re-enters the publicly-available widely disseminated network 1065. Further security may be provided by including on clients 1000, 1010 and 1120, or a subset thereof, digital rights management software which checks for connections (such as by pinging) to publicly-available widely disseminated networks, such as the Internet, and which is operatively configured to permit decryption of the encrypted code only if there is no active connection to one ore more publicly-available widely disseminated network.

Figure 1:
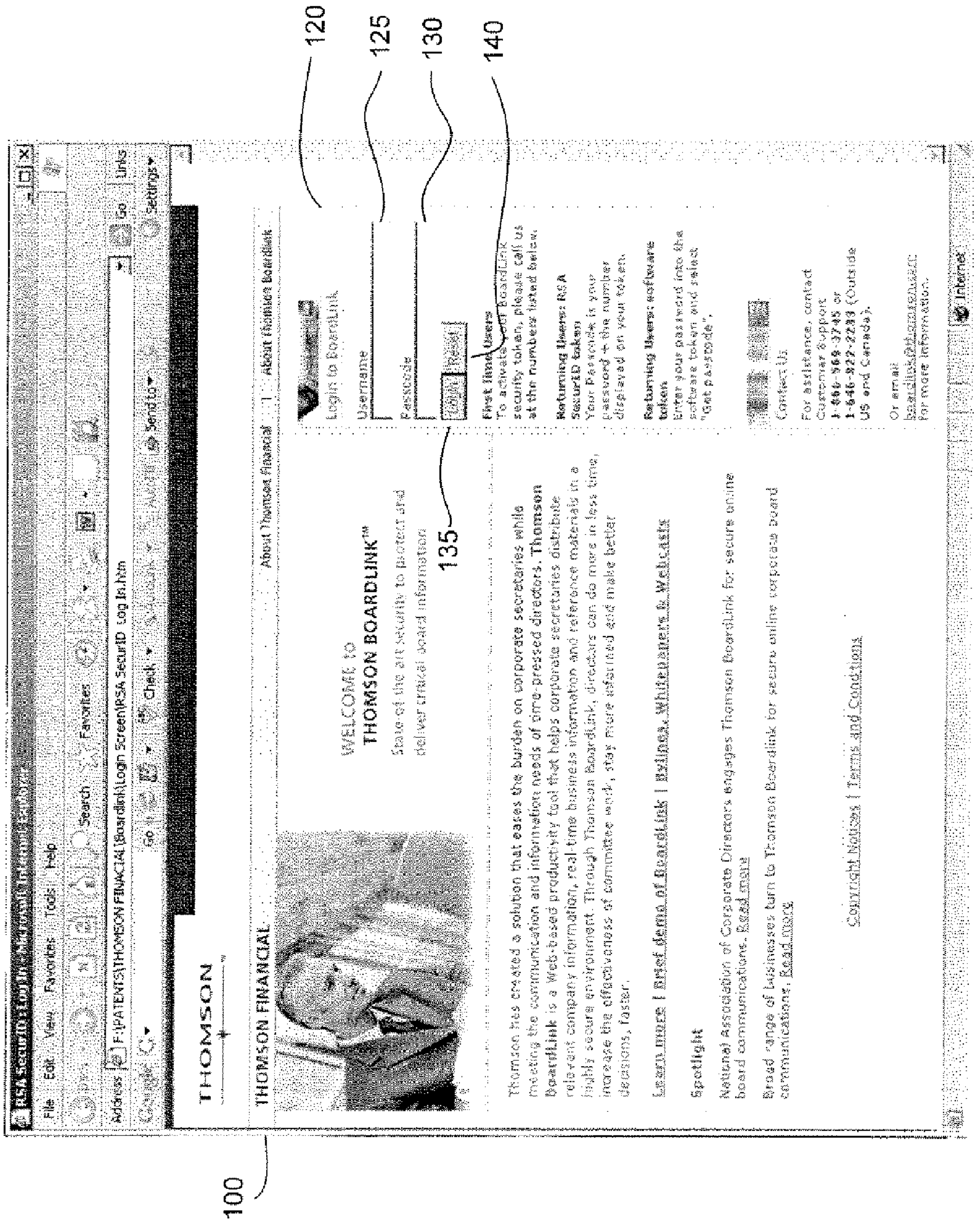
FIG. 1 is a screen shot of a user interface 'User Login' information page.

Turning to FIG. 1, there is shown an exemplary web-based home page 100 allowing for access into an embodiment corporate board information management system. The exemplary web-based page 100 includes a login portion 120 which includes input boxes for input of the user's name 125 and a pass code 130. The pass code may represent a code generated by a program running on the user's computer or on a token provided to the user, with or without a user generated password. Input of username and pass code may be by means of login button 135, with reset button 140 permitting resetting of the username and pass code. After activation of login button 135, authentication of username and pass code permits access to main functionality screen 200 of FIG. 2 that may acknowledge authentication, for example, by way of a welcome banner 220, or similar text, or by sound or other sense messaging. Main functionality screen 200 may provide links allowing a user to obtain information of interest to the user.

Figure 2:
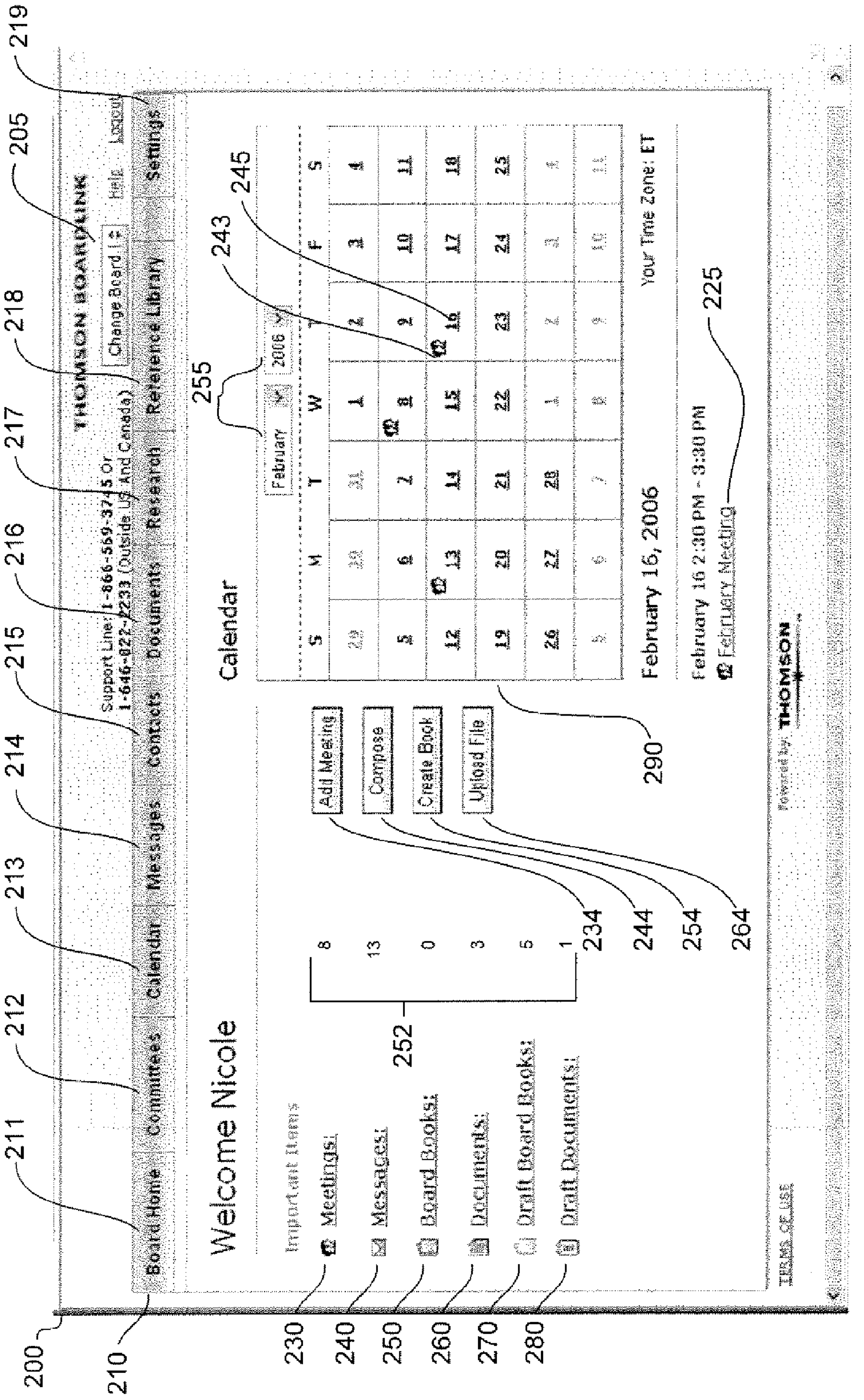
FIG. 2 is a screen shot of a user interface 'Board Home' information page.

As depicted in FIG. 2, main functionality screen 200 may permit users to obtain link information pertaining to the corporate board on which they sit. If a board member sits on more than one board, the board information links may change according to the board selected by the user. Board selections may be made, for example, by way of selection box 205 which allows an user to change board information links simply by selecting the appropriate board from a drop down menu or scroll menu. The types of information links available through main functionality screen 200 may differ significantly. For example, as depicted in FIG. 2, the screen display may include a graphic information link such as calendar 290 which depicts the period of time as set forth at selection boxes 255. The current date 245, non-available times, holidays, etc., may be highlighted, or otherwise visually designated and one or more graphics 243 may be associated with a day on the calendar in superscript, subscript, or median fashion to graphically depict the type of activity scheduled for that day and the relative time frame in which the activity will take place (as shown at 243, for example, a meeting in the morning (subscript) versus mid-day (normal script) or in the evening (superscript)). Graphic symbols may further be explained in a legend, as depicted at 225, under the calendar or other graphic incorporating graphic symbols, and such legends themselves may include links to more detailed information. Information links 230, 240, 250, 260, 270, and 280 each provide links to different information sources, respectfully as depicted, meetings, messages, board books, documents, draft board books and draft documents. The number of distinct information sources retrievable through such links may be set forth in conjunction with information links 230, 240, 250, 260, 270, and 280 as shown at 252. Buttons 234, 244, 254 and 264 may provide for functionalities that alter information in the information links 230, 240, 250, and 260 or in the graphic.

In an embodiment, users of the system are presented at main functionality screen 200 with a number of window selection tabs 210, for example, board home tab 211, committee tab 212, calendar tab 213, message tab 214, contacts tab 215, documents tab 216, research tab 217, reference library tab 218, and settings tab 219. Each of these window selection tabs may allow for further selections by way, for example, generation of a pull down menu upon interaction with the tab.

In the example set forth, board home tab 211 allows the user to access the home page directly.

Figure 3:
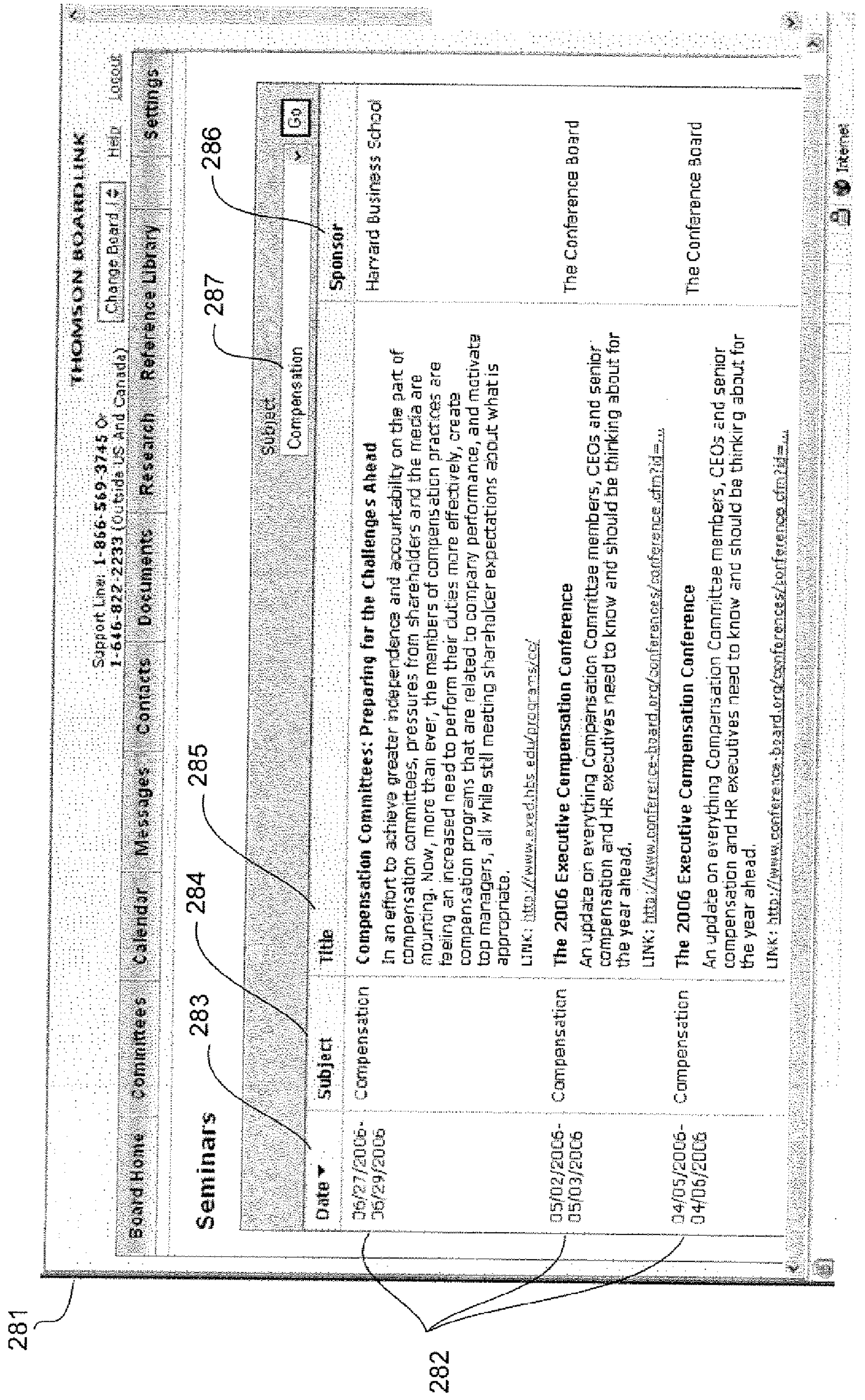
FIG. 3 is a screen shot of a user interface 'Reference Library Seminars' information page.

Interaction with committees tab 212 allows the user to select a specific committee in which the user is involved from a pre-existing list of committees. This pull-down tab may permit the user to select a specific committee from a pre-existing list. Upon selection, the user may be taken to that committee's specific page where the user will have the ability to manage committee meetings, committee board books and committee documents that are relevant to the selected committee. FIG. 3 illustrates an exemplary embodiment committee page 281. The user may select on such page via pull down menu tab 287 the subject of interest, in the case illustrated "compensation" and the subtype of information requested in this case "seminars." Presentation may then be made on the web page of different information pertaining to the subject and subtype of information requested, as shown, date of the seminar 282, subject of the seminar 284, title of the seminar 285, and sponsor of the seminar 286. The user may also have the capability to send messages to all members of the given committee directly from this page. In one embodiment, only the corporate secretary and members of a specific committee will have access to a committee page.

Figure 4:
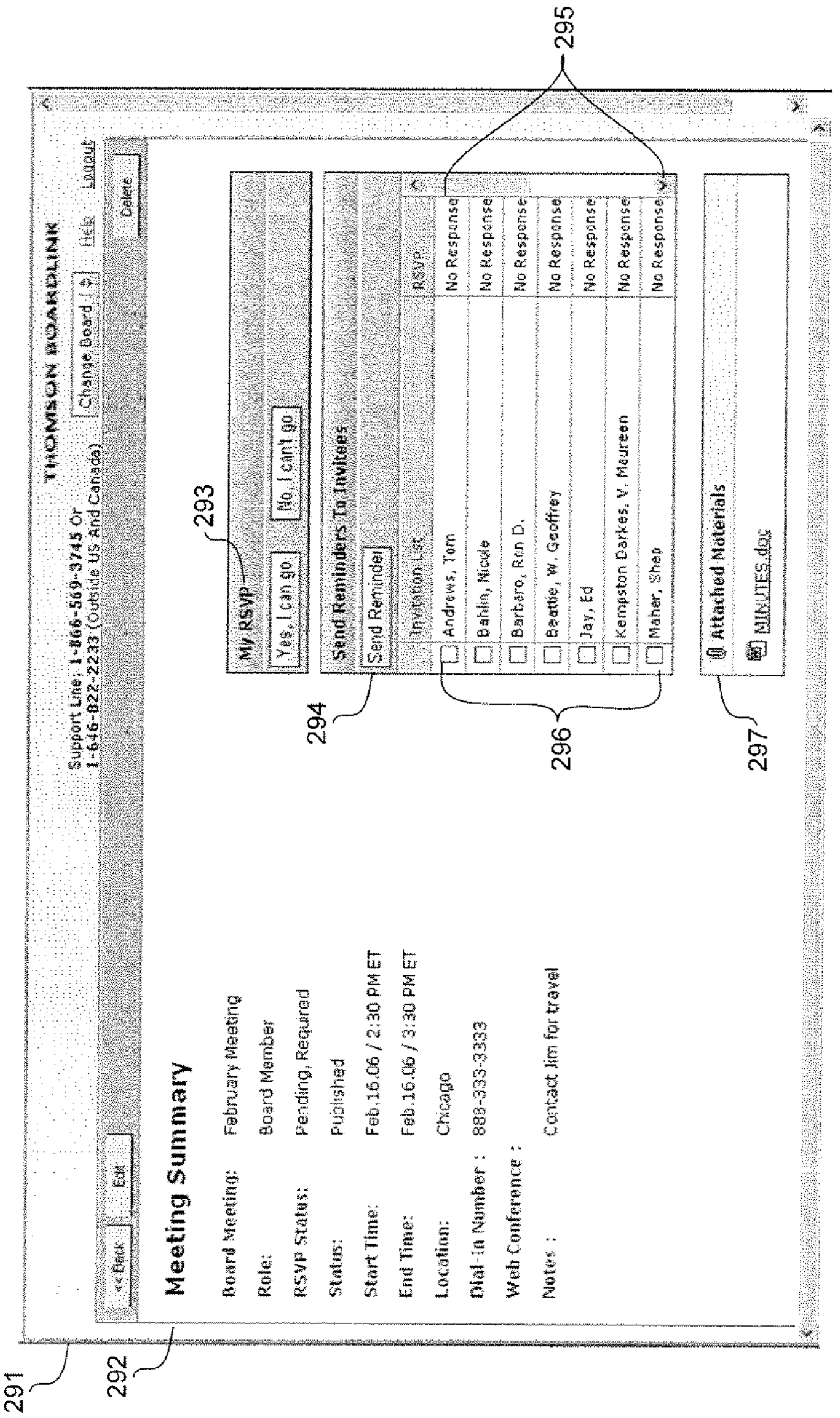
FIG. 4 is a screen shot of a user interface 'Meeting Summary' information page.
Figure 10:
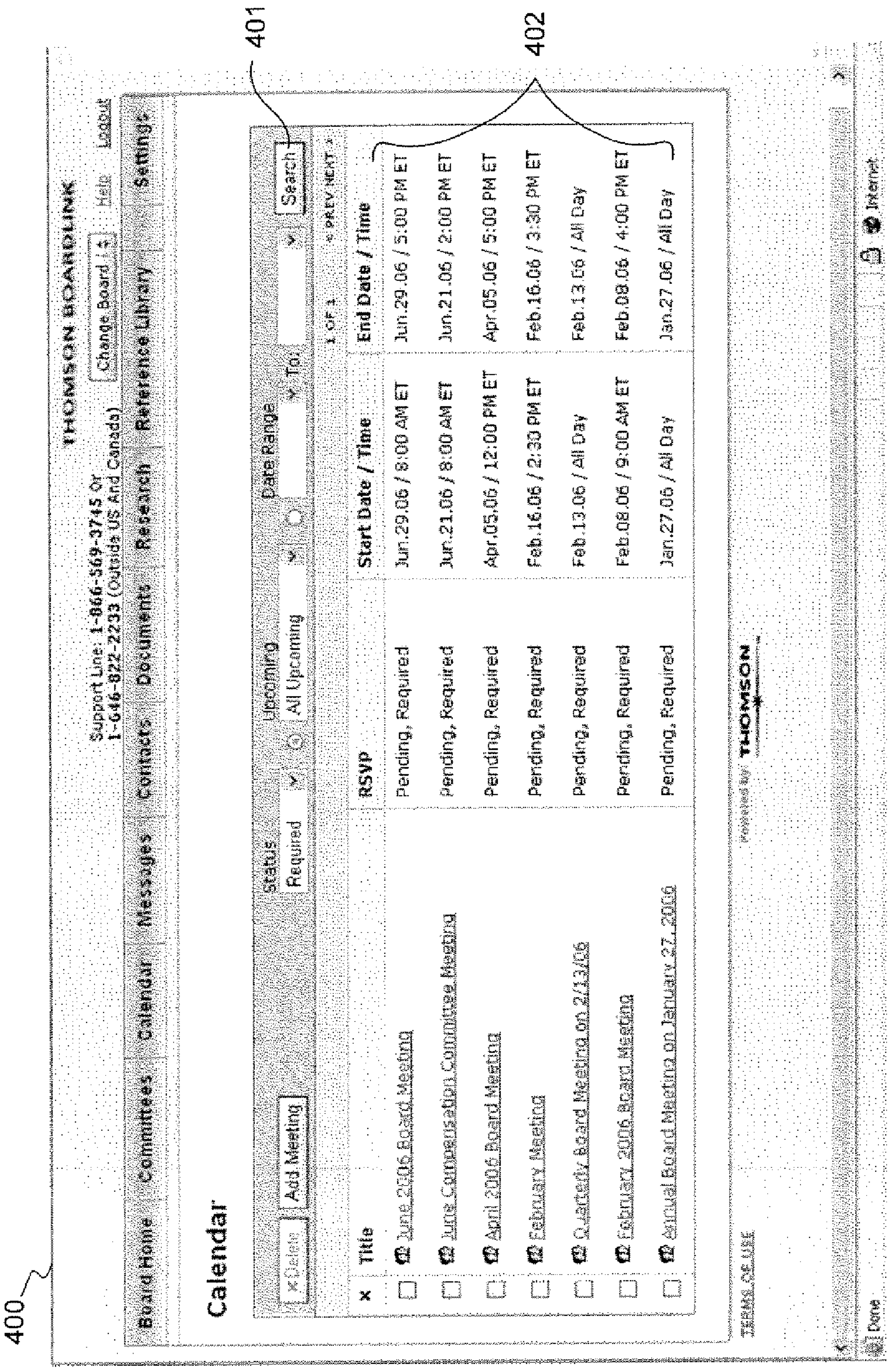
FIG. 10 is a screen shot of a user interface 'Calendar' information page.

Interaction with the calendar tab 213 may be designed to bring the user to a list of upcoming scheduled events. By clicking on a specific meeting, the user may gain access to relevant meeting materials as well as have the option to RSVP to the selected meeting. As shown in FIG. 4, screen 291 displays, a meeting summary 292 setting forth particulars of the meeting such as dial-in number, start and end time may be set forth, with the RSVP status 295 of each invitee 296 set forth. RSVP buttons 293 may be provided to transmit an attendance reply or non-attendance reply, and/or to change a prior reply with respect to attendance/non-attendance. A reminder button 294 may also be operatively configured to cause an invitation reminder to be sent to one or more invitees who have not indicated whether they will or will not be attending the meeting at the published times. Material to be discussed at the meeting, or to be reviewed before the meeting, may be appended such as at attached materials box 297. If the meeting is one that the user has scheduled, the user may be given the ability to edit the meeting summary. Interaction with calendar tab 213 may cause display of a calendar web page such as set forth at FIG. 10. As shown at FIG. 10, screen 400 displays a calendar display 402 may set forth different events. As illustrated, meeting events past, present and future that have been or were scheduled are shown. Such type of event display may be controlled by the input into radio control panel 401 and/or selection through a meetings link.

Figure 12:
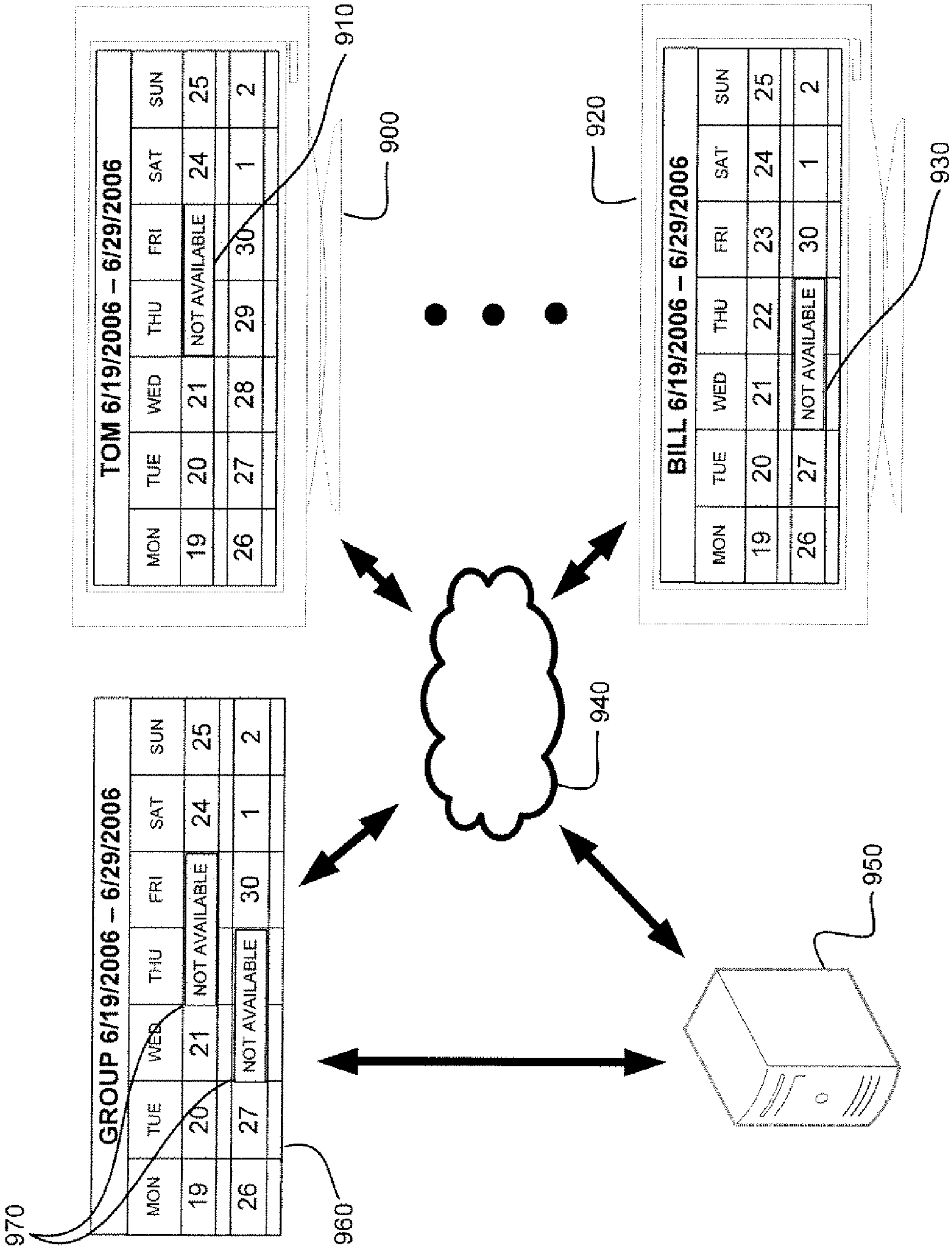
FIG. 12 is an illustration of a group calendar system.

Turning to FIG. 12, there is illustrated a system and method for scheduling meetings based on the schedules of more than one person. It is not atypical for individuals to maintain their own personal electronic calendars on their own computer systems or networks 900, 920. Each calendar may include information concerning the availability and non-availability 910, 930, respectively, of the individual over a period of time, and within a day within such period of time. In an embodiment, there is disclosed a system and method which pulls information concerning the availability of persons from their electronic calendars stored on their computer systems and networks 900, 920 and computes a group calendar 960 from such multiple inputs to determine the availability (or at least no notation of non-availability) and non-availability of persons within such group. Such system and method provides for pulling information from calendars of persons within the group from a single network as well as across networks and disparate networks. As illustrated data may be obtained from such calendars by access of a processor 950 maintaining a program configured to receive input from each calendar and to generate a group calendar through a publicly-available widely disseminated network 940, such as the Internet, or through other transmission means as more private network connections. From the group calendar, one can then determine times best suited for a meeting, telephone conference, video conference, event, etc. (avoiding non-availability times 970). In one optional aspect of such embodiment, the program may automatically generate a request for a meeting based upon input into the group calendar, e.g., in respect to group calendar 960, a suggestion that a meeting be held on June 19, 20, 21, 26, 27, or 30. Of course, such suggestion may be sent with an RSVP request. If such request is not responded to, the program may be configured to provided further RSVP requests. If a RSVP request is denied, the program may search for other days of availability and suggest the same, e.g., in respect of input on group calendar 960 a Saturday meeting on June 24 or July 1. The system may look at a number of factors in the time realm, such as time of day, days fitting within a period of time forecast to meet certain weather conditions, day of week, times surrounding or encompassing another event, etc. A desired time realm for a meeting may be contiguous or non-contiguous, for example, a seminar may be desired to be held on a Monday morning, Wednesday afternoon, and Friday at noon.

Figure 5:
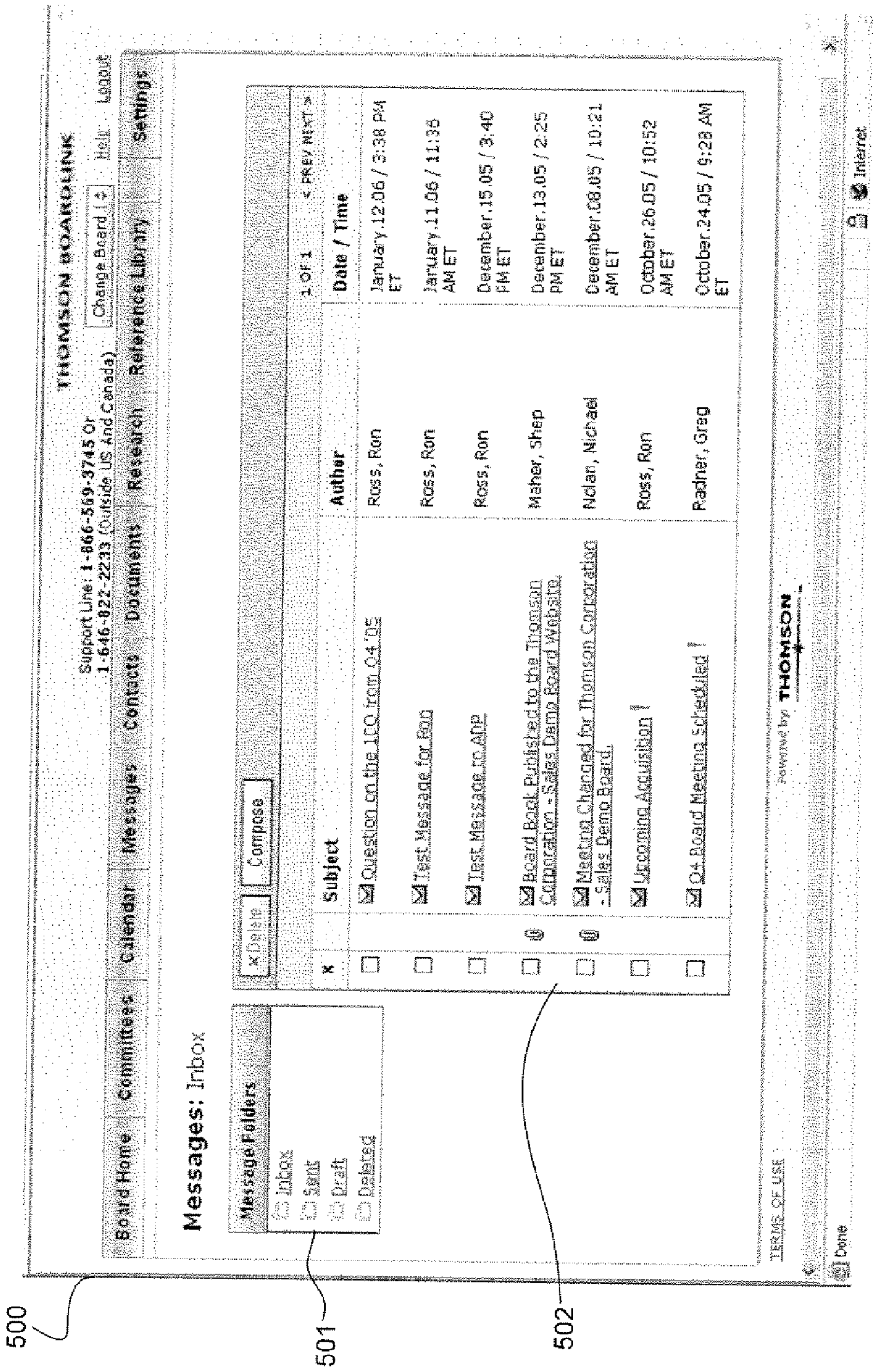
FIG. 5 is a screen shot of a user interface 'Messages' information page.

Interaction with the messages tab 214 may be designed to bring the user to the secure messages feature of the system. From this area, a user may compose and delete secure email messages as well as organize email into folders. Emails may be secured causing encrypted emails to be sent to the user, such secured emails may or may not be allowed to be read when the user is connected to a publicly-accessible widely distributed network, such as the Internet. To notify a user of a secured email on the system, without the user needing to be connected to the system itself, the user may be sent an email via a publicly-accessible widely distributed network, such as the Internet, to standard notifying devices, such as a blackberry or smart phone with email capability. The user may then request through the publicly-accessible widely distributed network the email from the system by entering into, for example, message web page 500 of FIG. 5 having message folders 501 containing numerous messages 502 which may be selected for review. Selected messages may then be sent in encrypted form to the user, for review when the user is online, or more securely off-line with respect to the publicly-accessible widely distributed network.

Figure 11:
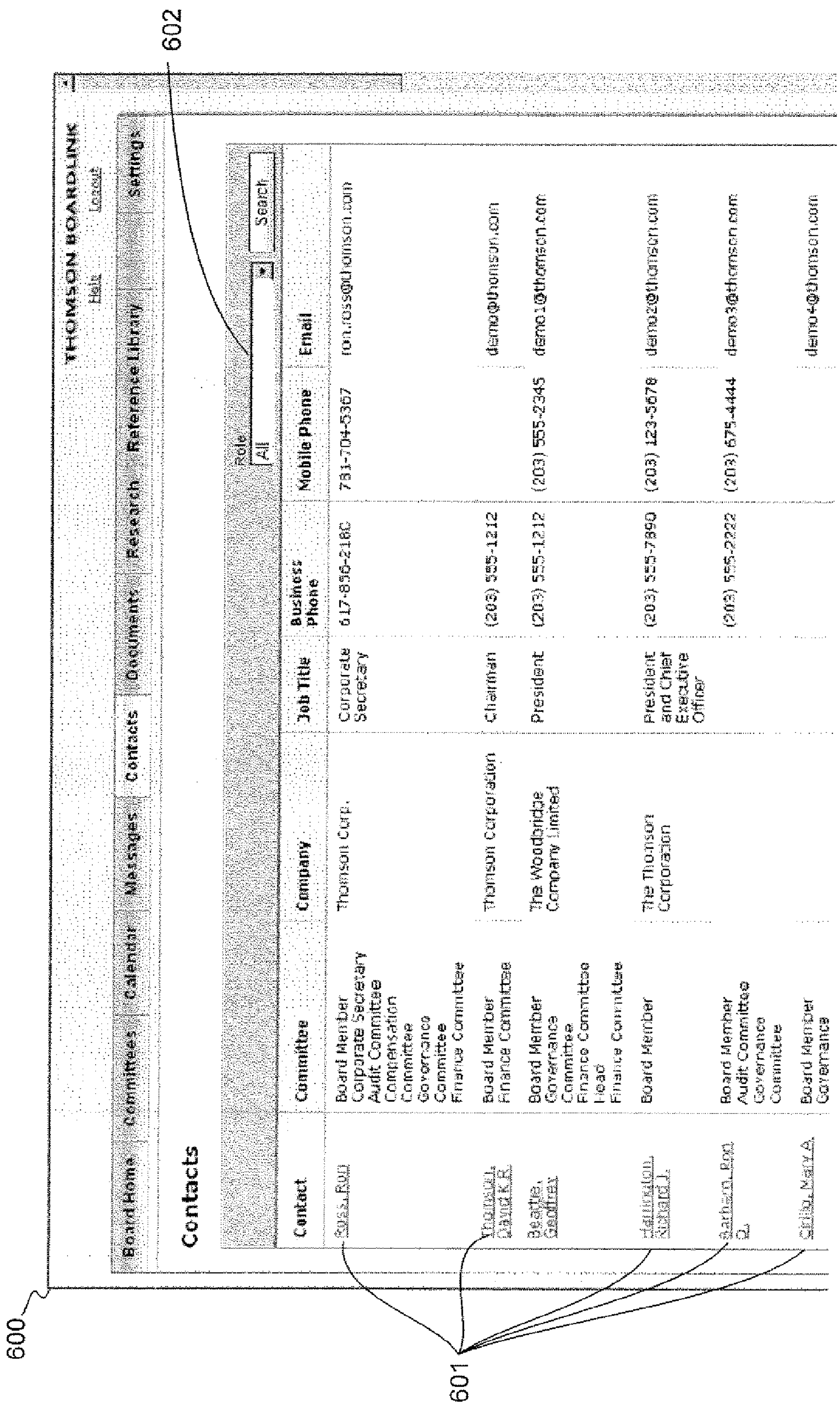
FIG. 11 is a screen shot of a user interface 'Contacts' information page.

Interaction with contacts tab 215 may proffer the user with such information as the contact information for all board members, which information may be filtered by committee. By clicking on a specific contact's name, the user may be led to additional biographical information about the individual. By clicking on the contact's email address, an email may be sent directly to the contact member by a publicly-accessible widely distributed network, or the one email may be sent by a publicly-accessible widely distributed network that informs the member of a secured email on the system, and the system once logged into by the member may send an encrypted transmission comprising the actual message. As indicated above, such encrypted message may be configured to allow the member only to read the message when not connected into a publicly-accessible widely distributed network. FIG. 11 illustrates an exemplary contact web page 600 which may be entered by interaction with contacts tab 215. Message access to individuals may be made by means of links such as seen at 601. Contacts desired to be reviewed may be tailored by selecting a role for the committee members of interest as through, for example, search box 602.

Figure 6:
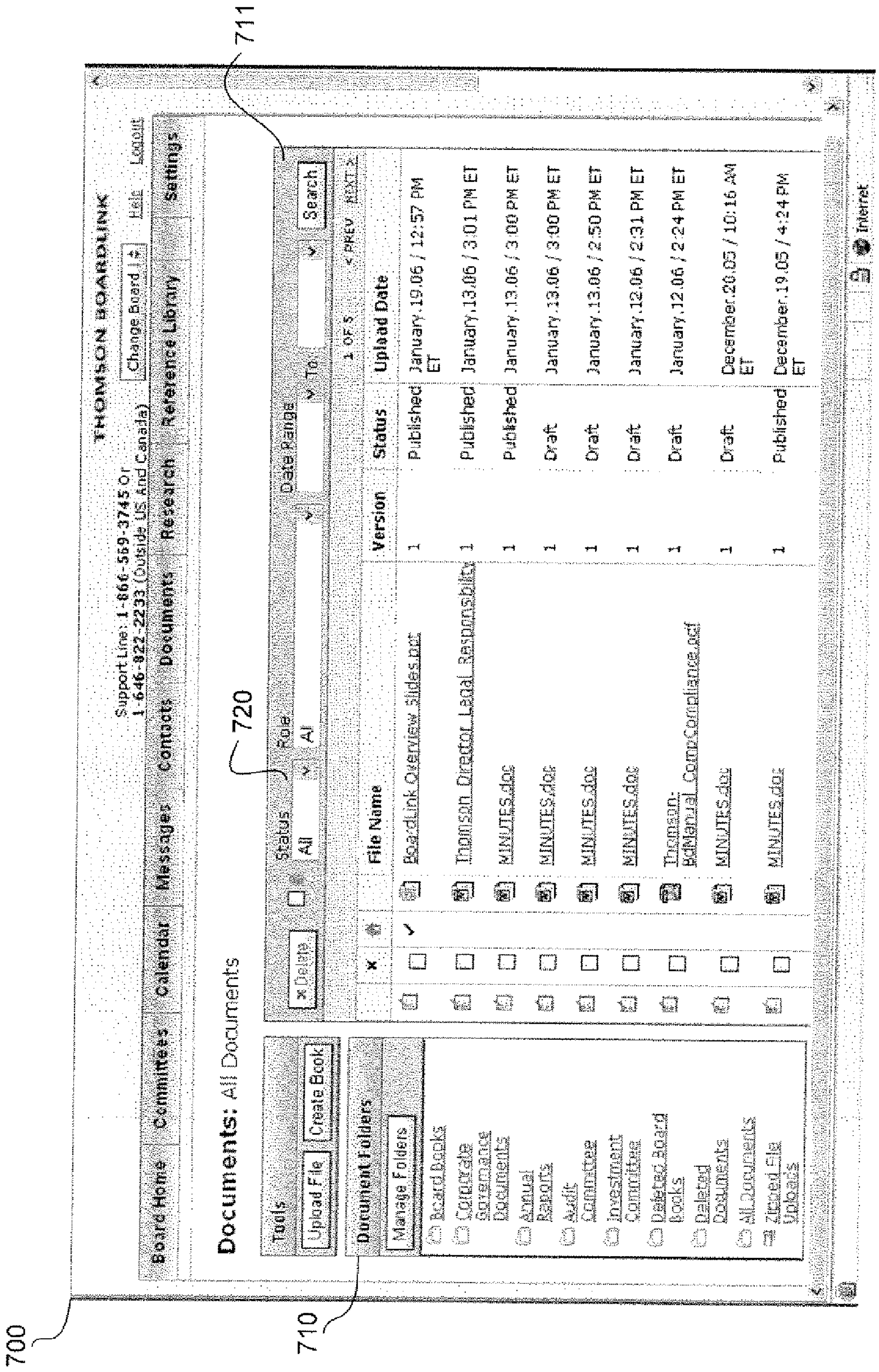
FIG. 6 is a screen shot of a user interface 'Documents' information page.

When interacting with a documents tab 216, the user may be taken to document access web page 700 such as seen at FIG. 6. Such access web page 700 may comprise a document folder portion 710 of the web page and a folder document descriptor portion 711 of the web page allowing for one to select the folder the user is interested in (such as "all documents" as shown in FIG. 6) and then to choose the particular document of interest from folder document descriptor portion 711 of the web page. The user may be provided with drop down choices, such as to review specific documents or all documents, or a subset of the same. Documents may be searched for by input into a search bar portion 720 of the web page. For example, the user may select to review a particular board book. The user may then be provided the opportunity to organize documents by managing folder, search for documents by descriptors, such as date, committee and status. The user can then view such documents. The user may also upload new documents, new versions of documents, as well as work with documents, such as board books, via the web page. The user may be provided with both final and draft documents, such as board books. Authority may be needed for a user to enter and change any such documents. For example, draft board books may only appear on a committee head's or corporate secretary's screens when they are the only users who have the access to create board books.

Figure 7:
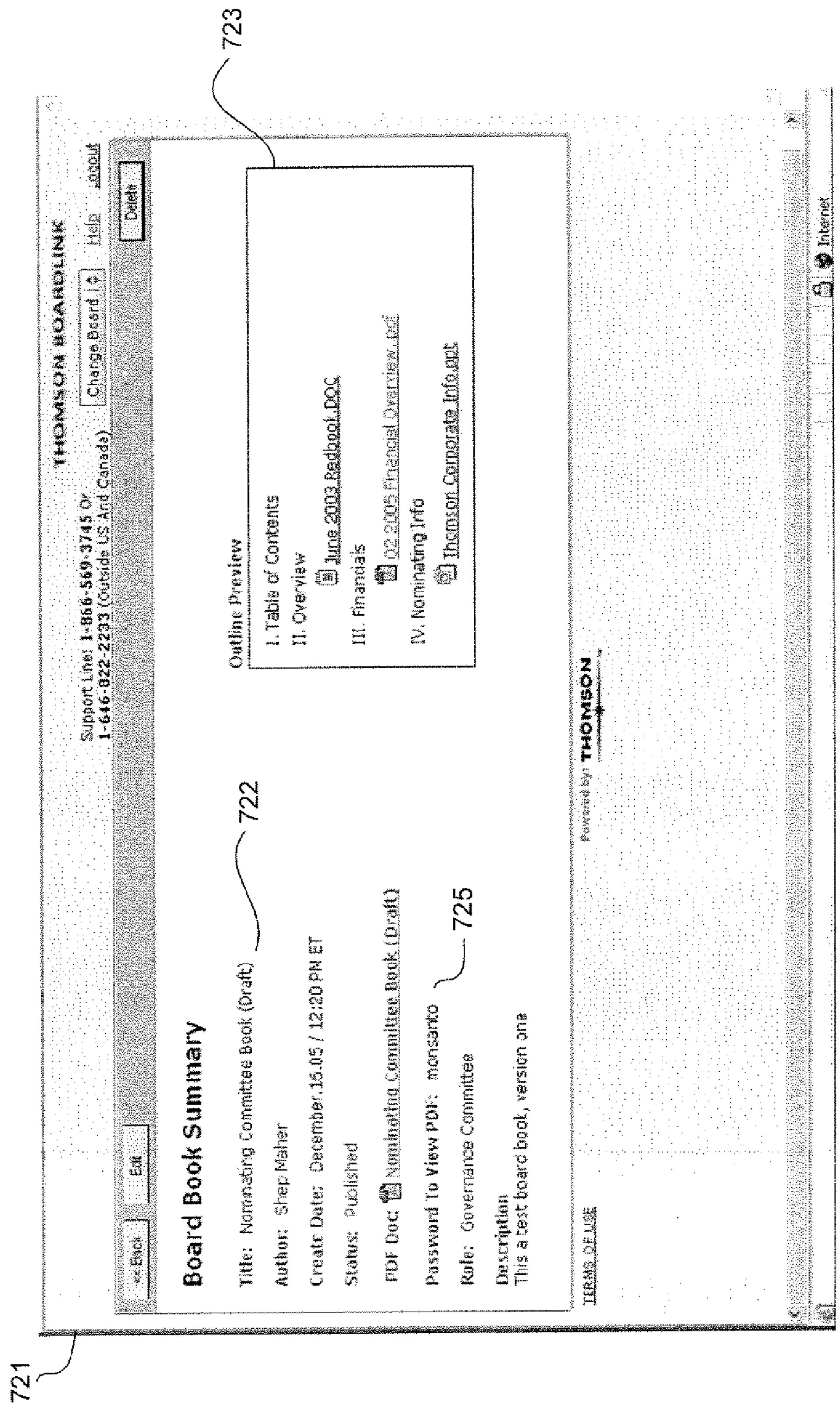
FIG. 7 is a screen shot of a user interface 'Board Book Summary' information page.
Figure 8:
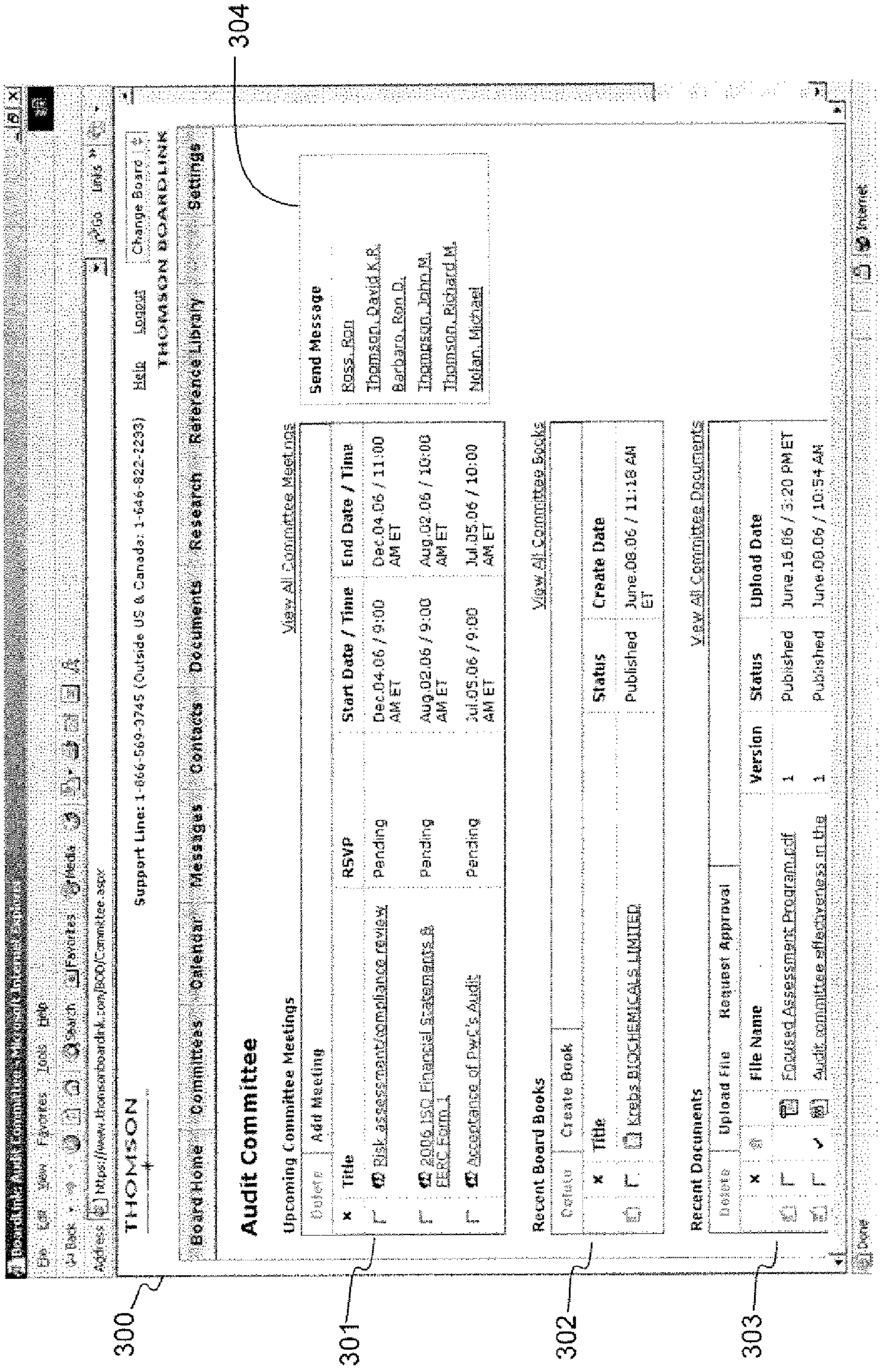
FIG. 8 is a screen shot of a user interface 'Audit Committee' information page.

FIG. 7 illustrates an exemplary web page 721 for reviewing materials related to a board book. Such web page may comprise a web page portion 722 summarizing the board book being reviewed such as date created and role of the book. A password 725 which must be entered to read certain documents may be appended therein to further secure access to confidential documents. In one embodiment, there is provided an outline preview portion 723 which sets forth a review of the board book being reviewed, allowing documents to be reviewed without need to open the entire book and scroll to the document of interest within the board book. FIG. 8 illustrates an exemplar web page 300 that may be displayed upon seeking information related to audit committees as offered in document folder menu 710 of FIG. 6. Such web page may be divided into different information boxes, as shown, upcoming committee meeting portion 301, recent board books related to committee interest 302, and recent documents of committee interest 303. Functionality may further be supplied to allow the user to contact other members of the committee with messages as through send message box 304.

Figure 18:
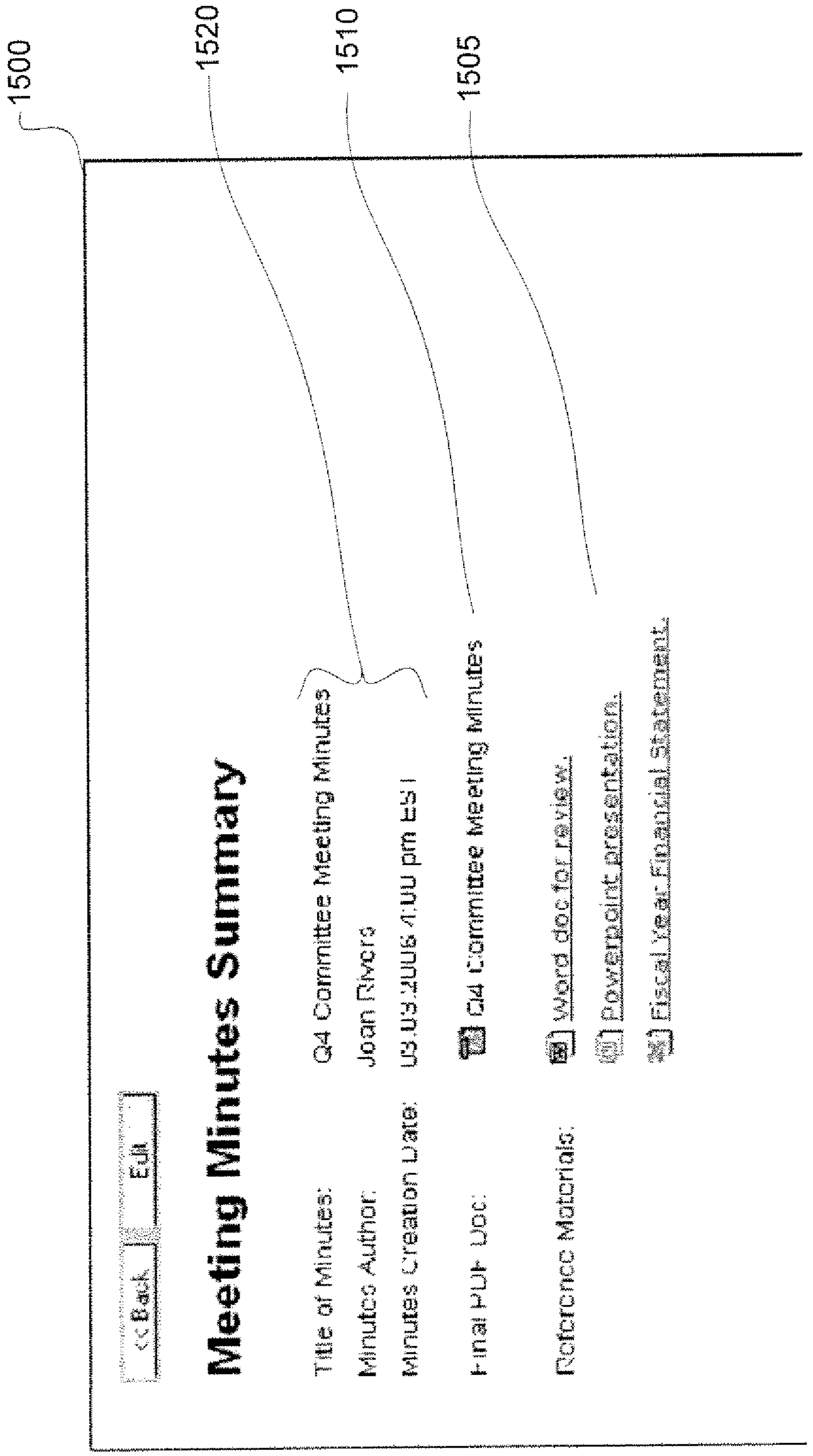
FIG. 18 is a screen shot of a meeting minutes summary page.

In an application of a minute writer functionality, the user submits a request to create new meeting minutes, the system opens a form for creating meeting minutes, the user create minutes within a board book summary with attached files pre-populated in the minutes forms, the system loads a list of users who were invited to the meeting, the user checks off the attendance of those persons at the meeting, the user enters additional information about the meeting, the user adds or removes reference materials that were covered or not covered in the meeting, the user edits the permission list to indicate who can view and edit minutes, the system populates the minutes with input by the user, the user formats the content of the minutes and writes the meeting minutes. Once the notes are done, the meeting minutes may be saved in pdf to prevent inadvertent or unauthorized changes to the minutes and the user may route the minutes for approval, or the system may automatically route the minutes for approval. The meeting minutes when in editable form may be edited to remove attached materials, to alter user permissions (whether the user has full control or read only permission to the minutes), or select another board book or meeting. The ability to alter the populated agenda from the board book is important as last minute changes in agenda may occur during a board meeting. The user should be able to view a summary of the meeting minutes from a list of meetings stored on the system. Such summary may be in a form such as shown in FIG. 18, a screen 1500, wherein a pdf version of the meeting minutes 1510 along with any reference material documents 1505 are included along with summary information 1520. A user advantageously many edit and make changes to the minutes while viewing the meeting summary if authorized to do so.

Figure 14:
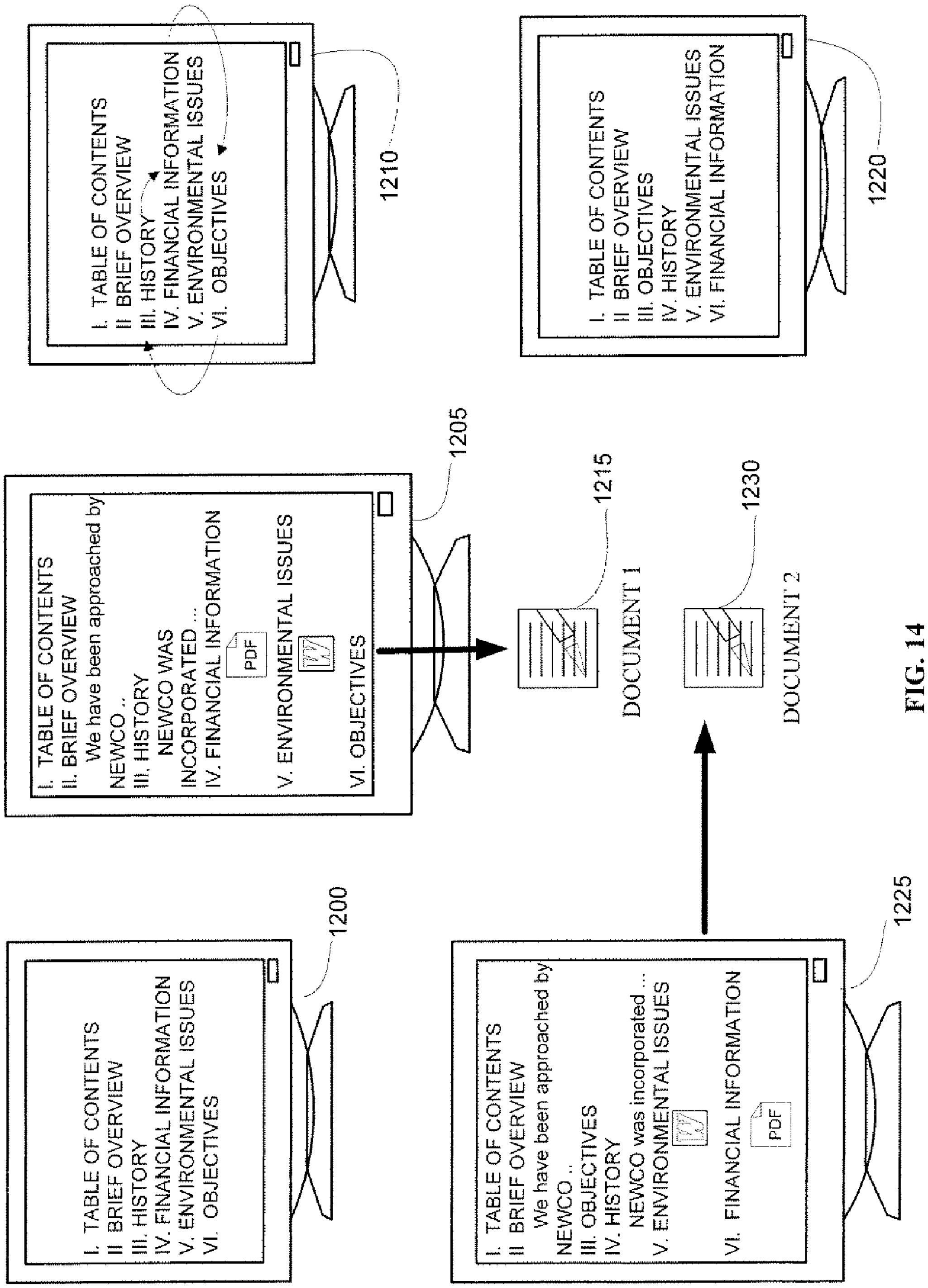
FIG. 14 is an screen shot sequence showing a document modification system.

The system may include functionality allowing for easy manipulation in the production of documents and books. Such functionality is shown in FIG. 14, wherein there is shown a system for creating a document from an electronically displayed outline. Such system employs software and/or hardware, or a combination of the same, that allows for preparing an outline having headings and subheadings and which permits text to be written under the headings/subheadings, and/or documents imported under such headings and subheadings. Such system then allows one by simply moving the headings and subheadings in the outline, or the outline annotated with the text/documents, and to generate a newly ordered document based upon the reordered headings and subheadings without the need to manually move the text itself, and then to regenerate the outline. Thus there is provided a method in a computer system wherein reordering within a first document a first heading associated with first text with respect to a second heading associated with second text without moving the first or second text, and then automatically generating a second document with the first and second text being ordered according to the reordering of the first and second heading. An examplar application is illustrated in FIG. 14. At 1200 there is illustrated an exemplar outline. Such outline may then be filed in by providing text, or documents under the headings, as seen at 1205 and a document/book 1215 produced in the order of the outline. Headings in such system are permitted to be reorder with respect to one another either in an over all outline screen such as shown at 1210 or with respect to an annotated outline as at 1205. A reordered outline 1220 and corresponding reordered annotated outline 1225 is thus produced, allowing a differently ordered document/book 1230 to be produced.

Figure 15:
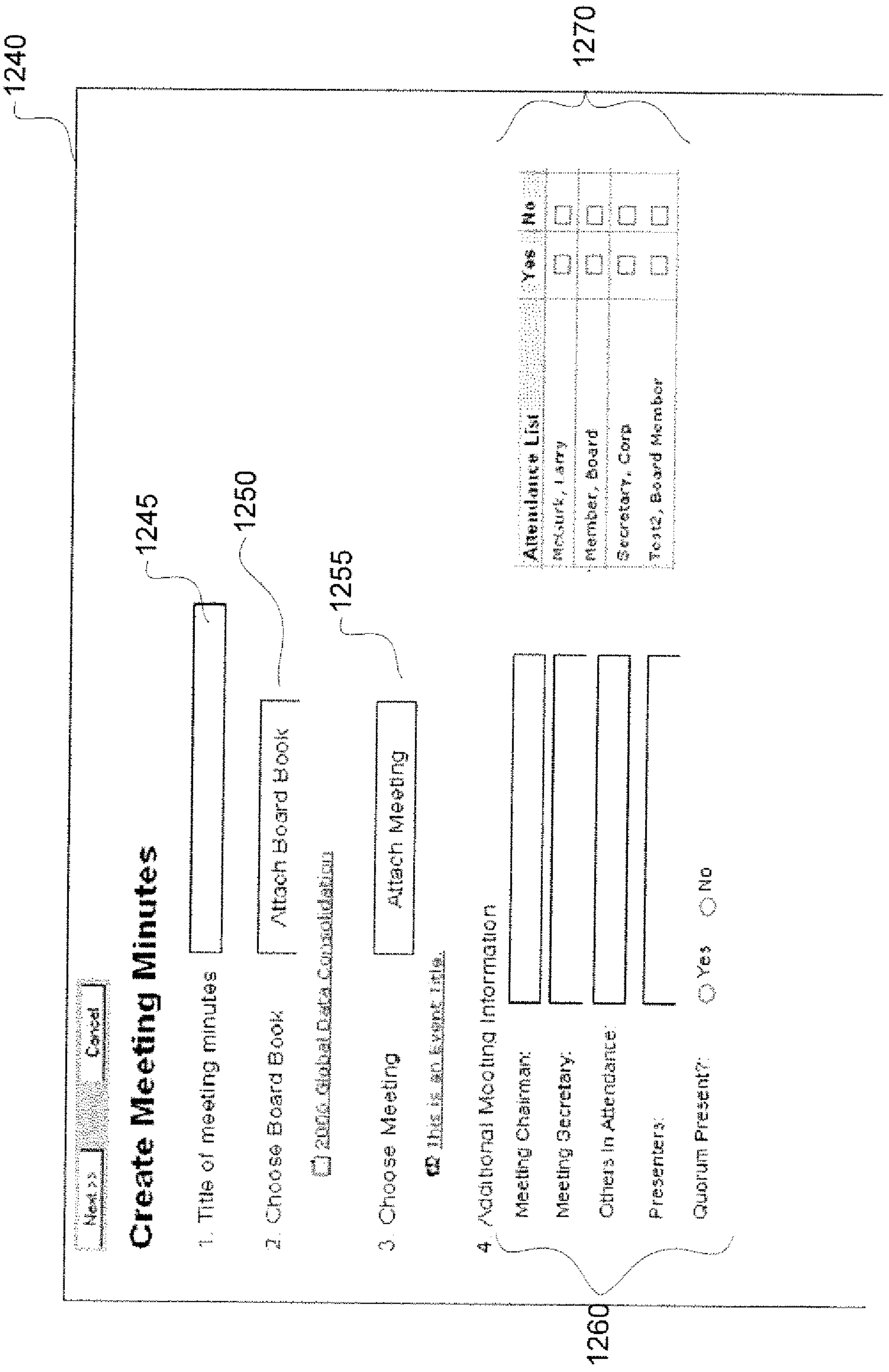
FIG. 15 is a first screen shot of a meeting minutes creation page.

FIG. 15 illustrates a screen 1240 which may be reached through the documents tab or other tab or folder such as the board book summary or meeting summary, which provides a tool for quickly creating a minutes template and recording meeting meetings for, for example, a board meeting. For example, the system may be configured to create meeting minutes directly form a board book summary, with the board book agenda and attached files included in the minutes.

Figure 16:
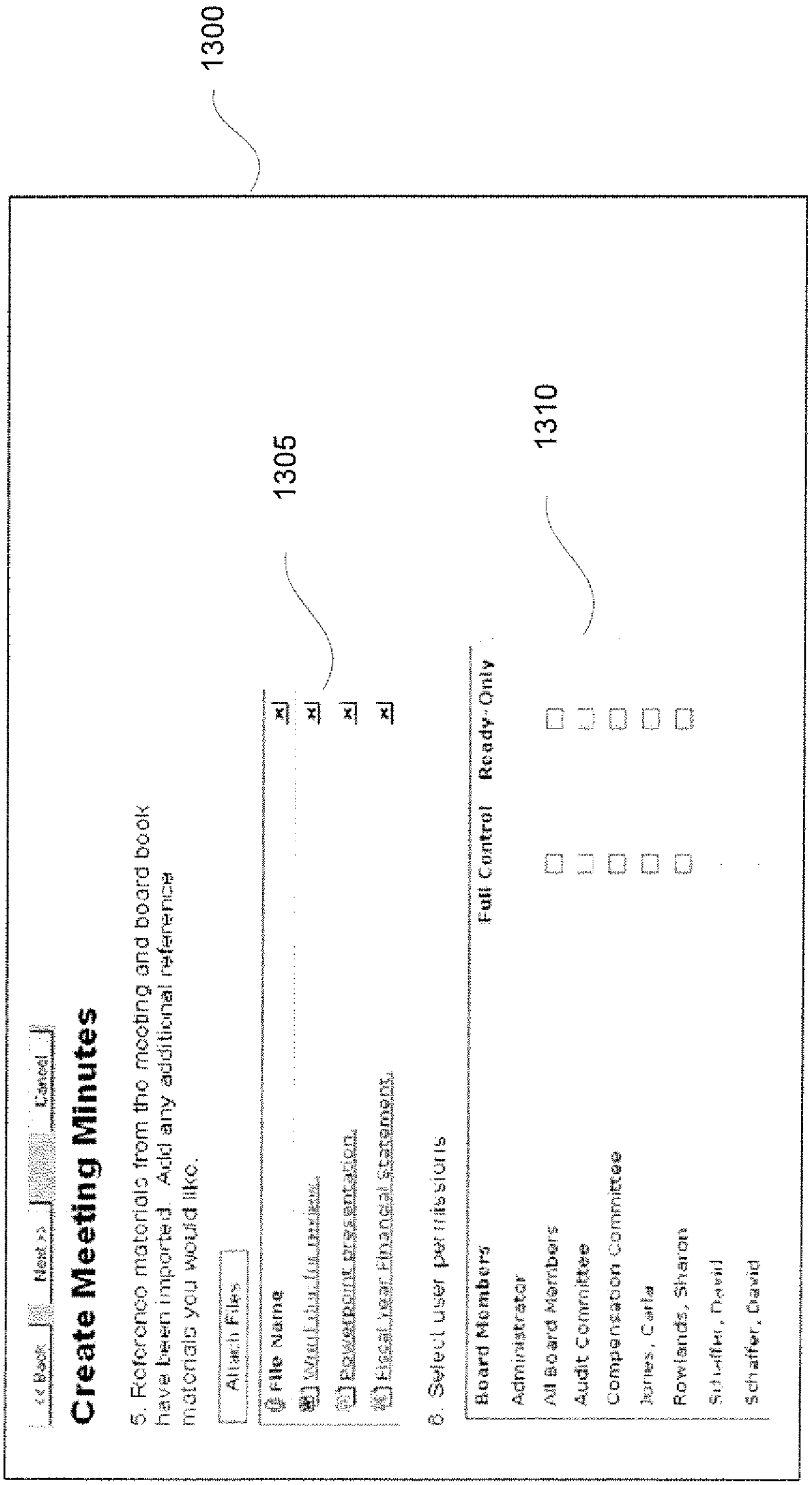
FIG. 16 is a second screen shot of a meeting minutes creation page.
Figure 17:
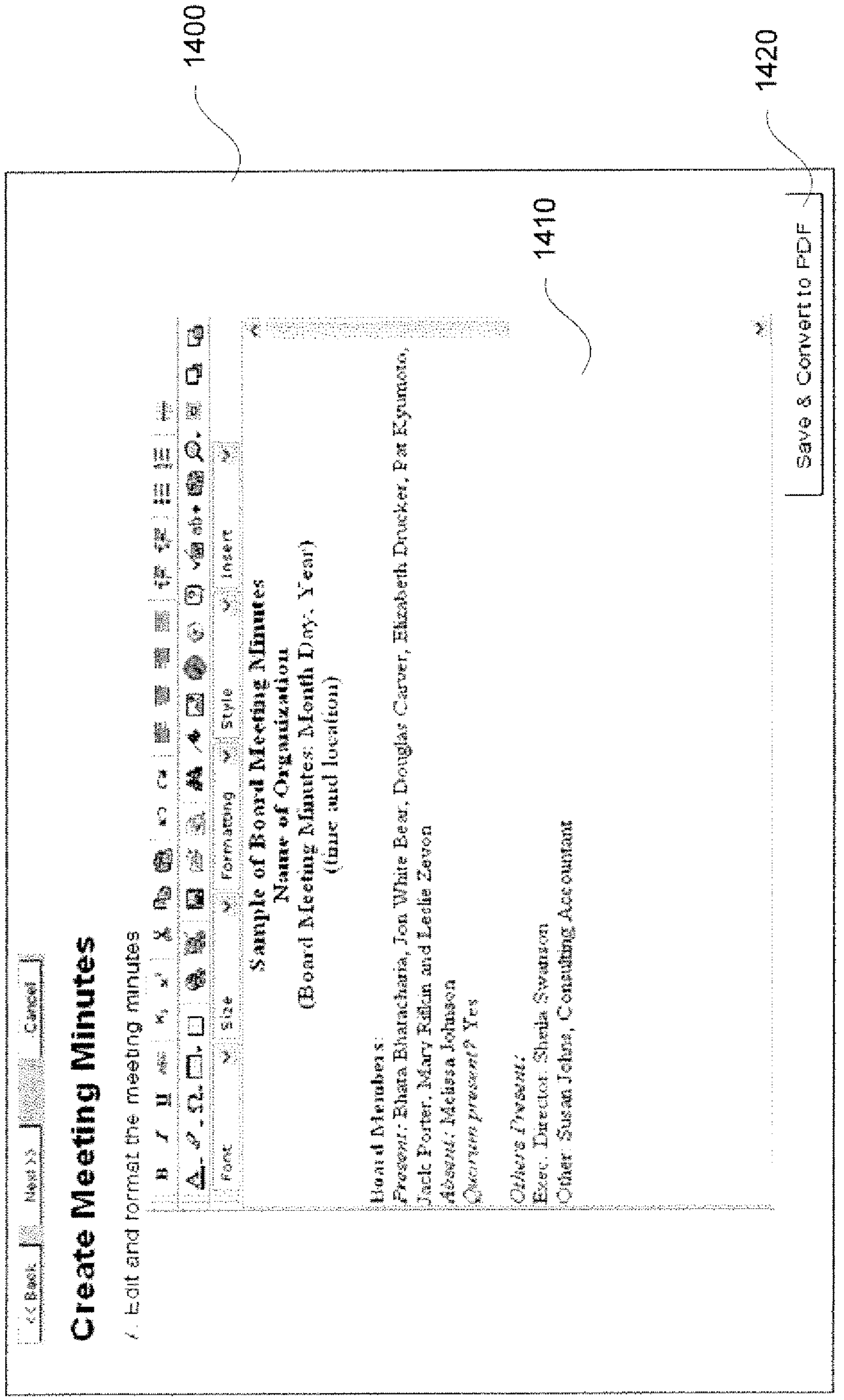
FIG. 17 is a third screen shot of a meeting minutes creation page.

Minutes typically include a record of all actions taken during a meeting and record the comings and goings of participants, and may include the amount of time spent on each agenda item, and any deviation from the agenda. Minutes are usually taken during the meeting or immediately thereafter and may be required to be routed for approval, with a final copy being retained permanently or for significant periods of time. As illustrated at FIG. 15 meeting minute creation screen 1240 provides input portions. At 1245 the meeting minutes are described in a title. At 1250 and 1255 one is allowed to attach one or more documents or books, such as a board book, or meeting, to the meeting minutes. At 1260 and 1270 information is input with respect to persons at the meeting and persons who could not attend the meeting with input pertaining to whether the meeting had enough persons who were needed for a particular authorization (e.g. a quorum). Looking at screen 1300 of FIG. 16, there is shown a further drill down to allow reference materials 1305 which may be useful in understanding the minutes, or events described in the minutes, to be viewed by select users, either with the right to alter the reference material or read-it only 1310. At FIG. 17, there is shown an exemplar screen page 1400 wherein a meeting minutes template 1410 from the input on the screens of FIGS. 15 and 16 is set up for input of minutes When minutes are completed the document may be converted to a pdf and saved 1420 (in order to prevent further manipulation of the document). A summary of the meeting minutes may be automatically generated as set forth at FIG. 18, wherein the meeting minutes along with reference materials are available via links. Other functionality that may be provided during creation of the meeting minutes include: importation/removal of the board book, importation/removal of meetings, attachment/removal of reference files, editing the user permissions, formatting and editing content of minutes and viewing of meeting minutes and summary.

Figure 9:
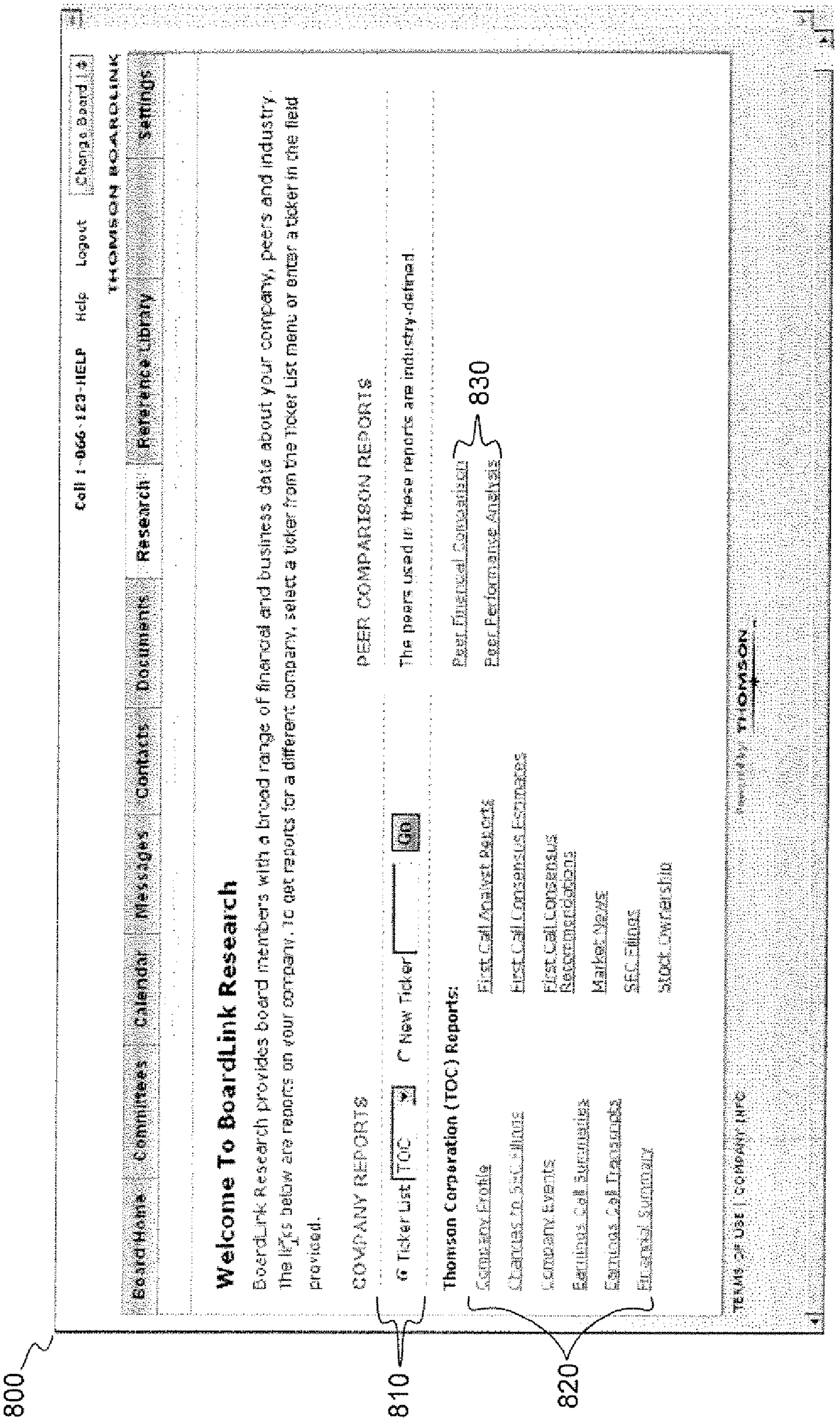
FIG. 9 is a screen shot of a user interface 'Research' information page.

The user may gain access to a research application offered by the system through research tab 217 of FIG. 2. For example, users may access via a research web page 800, such as shown in FIG. 9, to obtain company financial information 820, for example, without limitation, the latest analyst reports, earnings estimates, earnings call transcripts and briefs, news, financial reports, ownership information, and relevant SEC filings for the company which they represent. Information about the company may be provided automatically or upon input of information in radio buttons 810. Further information may be provided, after input by the user, regarding peer companies of interest to the user. For example, radio buttons 810 may be used to obtain information regarding the peer company. This feature allows board members to be able to keep up with the latest news and information about their company, and peers of their company 830.

The user may also be provided with access to a reference library tab 215 which may lead to a web page allowing the user to gain access to static information related to topics of interest to board members. As with other tabs discussed, the tab may have drop down functionality, in this case allowing access articles on hundreds of corporate governance topics, corporate boards, and reported deals.

Settings tab 219 allow a user to manage an account on the system. Access to such tab may be limited in one or more aspects to certain users, such as corporate secretaries and/or assigned committee members. General users may have limited access so as to be able to make viewing choices which best suit their needs. For example, a general user may be allowed to go to "Settings" to establish the time zone they wish their calendar to be set to, customize their preferences and profiles, etc.

Such embodiment methods and systems, or elements of such embodiments, may entail the use of software, firmware, hardware, or a combination thereof to effectuate the functionalities described.

While many of such embodiments described above are directed to specific applications useful for members of a corporate board, it should be understood that such systems and methods have application to a much wider array of users and persons.

Statement Regarding Preferred Embodiments

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

The invention claimed is:

1. A computer-implement method comprising:

generating a first query from a server, the first query associated with a first electronic calendar maintained by a first party for periods of availability;

generating a second query from the server, the second query associated with a second electronic calendar maintained by a second party for periods of availability, the first query and second query;

receiving at said server a set of responses to the first query and the second query identifying from the set of responses a period of common availability adjusted for time-zone variations based on geographical differences of the first electronic calendar and the second electronic calendar;

generating automatically a group electronic calendar from the period of common availability adjusted for the time-zone variations; and generating automatically one or more webpages, based on said group electronic calendar, and individually tailored to each said first party and said second party, each webpage comprising a set of selection tabs and at least one personalized link associated with available user actions, wherein said group electronic calendar is operable to receive input from the first party via at least one of said one or more webpages and said personalized link is based at least in part on membership associated with the first party.

2. The method of claim 1 further comprising:

determining whether any of the periods of common availability fit within a desired time frame for a communication between said first and second party.

3. The method of claim 1 wherein the desired time frame is contiguous.

4. The method of claim 1 wherein the desired time frame is non-contiguous.

5. The method of claim 2 wherein the communication between the first and second party is selected from at least one of: a meeting, a teleconference, an audio-visual conference.

6. The method of claim 2 further comprising:

sending out an invitation for a communication between said first and second party if a period of common availability is determined within a desired time frame for a communication between said first and second party.

7. The method of claim 1 wherein said group electronic calendar is operable to receive input from both the first party and the second party.

8. The method of claim 1 wherein said group electronic calendar is operable to receive input from a third party associated via one or more webpages individually tailored to said third party.

9. The method of claim 1 wherein receiving input of a selection by the first party to said group electronic calendar via one of said one or more webpages causes a change to said at least one personalized link.

10. The method of claim 1 wherein said personalized link is a graphic.

11. The method of claim 9 wherein said graphic personalized link depicts the type of activity scheduled.

12. The method of claim 1 wherein receiving input of a selection by the first party to said group electronic calendar occurs via said at least one personalized link.

13. The method of claim 1 wherein said group electronic calendar is operable to receive input from a third party associated with one or more webpages individually tailored to said third party.

14. The computer system of claim 13 wherein said graphic personalized link depicts the type of activity scheduled.

15. The method of claim 1, wherein the set of selection tabs comprises a calendar tab for listing one or more upcoming scheduled events.

16. The method of claim 1, wherein the set of selection tabs comprises a committees tab to manage information associated with a selected committee.

17. The method of claim 1, wherein the set of selection tabs comprises a reference library tab for providing access to information related to topics of interest of one or both of the first part and the second party.

18. A computer system for providing suggested meeting times in a desired time realm to two or more individuals maintaining on separate networks electronic calendars indicating availability over a period of time, said system comprising:

(a) means for querying from a serve said electronic calendars to determine periods of time within said time realm in which each of said two or more individuals have not indicated non-availability on their calendars;

(b) means for correlating those periods of time in which non-availability is not indicated in each of said two or more individual's electronic calendars to determine common periods of availability adjusted for time-zone variations based on geographical differences of the first electronic calendar and the second electronic calendar; and (c) means for suggesting meeting times for said common periods of availability by one or more created webpages individually tailored to each of said two or more individuals and each webpage comprising a set of selection tabs and at least one personalized link associated with available user actions and based on an electronic group calendar generated and adjusted for the time-zone variations, said electronic group calendar operable to receive input from the first party via at least one of said one or more webpages and said personalized link is based at least in part on membership associated with the first party.

19. The system of claim 18 further comprising:

(d) means for comparing said periods of common availability to determine those periods of time which most closely meet the desired time realm;

(e) means for transmitting one or more proposed meeting time encompassing said joint availability periods to said two or more individuals with a request for confirmation of attendance.

20. The system of claim 18 wherein the desired time realm is selected from the group consisting of: contiguous time frame, non-contiguous time frame, time of day, or time of year.

21. The system of claim 18 wherein the desired time realm is a period of time in which a meeting is proposed to be held.

22. The system of claim 18 wherein the desired time realm is a period of time during which a teleconference is proposed to be held.

23. The computer system of claim 18 wherein said electronic group calendar is operable to receive input from both the first party and the second party.

24. The method of claim 18 wherein said group electronic calendar is operable to receive input from a third party associated via one or more webpages individually tailored to said third party.

25. The computer system of claim 18 wherein receiving input of a selection by the first party to said electronic group calendar via one of said one or more webpages causes a change to said at least one personalized link.

26. The computer system of claim 18 wherein said personalized link is a graphic.

27. The computer system of claim 18 wherein said electronic group calendar is operable to receive input from a third party associated with one or more webpages individually tailored to said third party.

28. The computer system of claim 18 wherein receiving input of a selection by the first party to said electronic group calendar occurs via said at least one personalized link.

29. A computer-implement method comprising:

generating a first query from a server, wherein the communication uses a secure socket layer employing public key encryption over a publically available widely disseminated network, the first query associated with a first electronic calendar maintained by a first party for periods of availability;

generating a second query from the server, wherein the communication uses a secure socket layer employing public key encryption over a publically available widely disseminated network, the second query associated with a second electronic calendar maintained by a second party for periods of availability, the first query and second query;

receiving at said server a set of responses to the first query and the second query identifying from the set of responses a period of common availability adjusted for time-zone variations based on geographical differences of the first electronic calendar and the second electronic calendar;

determining whether any of the periods of common availability fit within a desired time frame for a communication between said first and second party;

generating a group electronic calendar from the period of common availability adjusted for the time-zone variations; and generating automatically one or more webpages, based on said group electronic calendar, and individually tailored to each said first party and said second party, each webpage comprising a set of selection tabs and at least one personalized link associated with available user actions, wherein said group electronic calendar is operable to receive input from the first party via at least one of said one or more webpages and said personalized link is based at least in part on membership associated with the first party.

* * * * *